United States Patent
Avadhani et al.

(10) Patent No.: US 11,709,485 B2
(45) Date of Patent: Jul. 25, 2023

(54) GENERATING FORECASTED EMISSIONS VALUE MODIFICATIONS AND MONITORING FOR PHYSICAL EMISSIONS SOURCES UTILIZING MACHINE-LEARNING MODELS

(71) Applicant: OneTrust LLC, Atlanta, GA (US)

(72) Inventors: Madan Avadhani, Palo Alto, CA (US); Akhil Dandamudi, Atlanta, GA (US)

(73) Assignee: OneTrust LLC, Atlanta, GA (US)

( * ) Notice: Subject to any disclaimer, the term of this patent is extended or adjusted under 35 U.S.C. 154(b) by 0 days.

(21) Appl. No.: 17/651,388

(22) Filed: Feb. 16, 2022

(65) Prior Publication Data
US 2023/0113009 A1    Apr. 13, 2023

Related U.S. Application Data

(60) Provisional application No. 63/262,200, filed on Oct. 7, 2021.

(51) Int. Cl.
*G06N 3/04*    (2023.01)
*G06Q 10/04*   (2023.01)
*G06N 3/045*   (2023.01)

(52) U.S. Cl.
CPC ............ *G06N 3/045* (2023.01); *G06Q 10/04* (2013.01)

(58) Field of Classification Search
CPC .............................. G06N 3/0454; G06Q 10/04
See application file for complete search history.

(56) References Cited

U.S. PATENT DOCUMENTS

2006/0271210 A1    11/2006    Subbu et al.
2011/0273737 A1*   11/2011    Hirao ................. H04N 1/00344
                                                358/1.14
(Continued)

FOREIGN PATENT DOCUMENTS

CN    112200350 A    1/2021
JP    2004-190620 A  7/2004

OTHER PUBLICATIONS

International Search Report & Written Opinion as received in PCT/US2022/070685 dated May 9, 2022.
(Continued)

*Primary Examiner* — Ann J Lo
*Assistant Examiner* — Van C Mang
(74) *Attorney, Agent, or Firm* — Keller Preece PLLC

(57) ABSTRACT

Methods, systems, and non-transitory computer readable storage media are disclosed for generating action recommendations for generating action recommendations for modifying physical emissions sources of an entity based on forecasting and monitoring emissions production for the entity utilizing machine-learning models. Specifically, the disclosed system forecasts emissions produced by an entity by utilizing a plurality of different forecasting machine-learning models corresponding to different physical emissions sources to generate forecasted source attributes. Additionally, the disclosed system combines the forecasted source attributes to generate a plurality of forecasted emissions value modifications for a future time period. The disclosed system generates action recommendations for modifying the physical emissions sources based on the forecasted emissions value modifications. In additional embodiments, the disclosed system tracks emissions of the entity during the future time period and generate additional
(Continued)

action recommendations in response to detecting deviations from forecasted emissions production.

20 Claims, 26 Drawing Sheets

(56) References Cited

U.S. PATENT DOCUMENTS

| | | | |
|---|---|---|---|
| 2018/0081999 | A1 | 3/2018 | Chappell |
| 2018/0082000 | A1 | 3/2018 | Chappel |
| 2019/0372345 | A1* | 12/2019 | Bain .................. G06Q 30/0601 |
| 2020/0372588 | A1* | 11/2020 | Shi ......................... G06N 20/00 |
| 2021/0065859 | A1 | 3/2021 | McKinney et al. |
| 2021/0073636 | A1 | 3/2021 | Federspiel et al. |
| 2021/0216932 | A1 | 7/2021 | Koguma et al. |
| 2023/0020417 | A1 | 1/2023 | Elbsat et al. |

OTHER PUBLICATIONS

International Search Report & Written Opinion as received in PCT/US2022/070629 dated Apr. 4, 2022.

Kung, Li et al., "A recommender system for the optimal combination of energy resources with cost-benefit analysis." 2015 International Conference on Industrial Engineering and Operations Management (IEOM). IEEE (Year: 2015).

Lin et al. "Planning of energy system management and GHG-emission control in the Municipality of Beijing—An inexact-dynamic stochastic programming model." Energy Policy 37.11 (Year: 2009).

U.S. Appl. No. 17/650,724, dated May 19, 2022, Office Action.

U.S. Appl. No. 17/650,724, dated Sep. 21, 2022, Office Action.

Bains et al. CO2 capture from the industry sector Progress in Energy and Combustion Science 63 (2017) 146-172.

International Search Report & Written Opinion as retrieved in PCT/US2022/015255 dated Apr. 4, 2022.

U.S. Appl. No. 17/592,878, dated May 16, 2022, Office Action.

U.S. Appl. No. 17/592,878, dated Aug. 23, 2022, Office Action.

U.S. Appl. No. 17/592,878, dated Jan. 25, 2023, Notice of Allowance.

U.S. Appl. No. 17/592,878, dated Mar. 9, 2023, Notice of Allowance.

U.S. Appl. No. 17/650,724, dated May 9, 2023, Office Action.

* cited by examiner

| Category | Entity Usage | Emission Source | Unit Cost | Unit Size | Unit | 2020 Units |
|---|---|---|---|---|---|---|
| Fuel Type | Restaurant Heater | Blast Furnace Gas | 10 | 1 | mmBTU | 15 |
| Fuel Type | Pizza Oven | Blast Furnace Gas | 20 | 1 | mmBTU | 10 |
| Fuel Type | Kitchen | Natural Gas | 20 | 1 | mmBTU | 15 |
| Fuel Type | Office Building | Mixed (Commercial Sector) | 30 | 1 | mmBTU | 5 |
| S1- Mobile Combustion | Business Travel | Aviation Gasoline - Aviation Gasoline Aircraft | 60 | 1 | gal (US) | 14 |
| S1- Mobile Combustion | Delivery 1 | Electricity- Mobile - Electric Vehicle | 23 | 1 | gal (US) | 12 |
| S1- Mobile Combustion | Delivery 2 | Diesel Fuel - Light duty trucks | 14 | 1 | gal (US) | 12 |
| S1- Mobile Combustion | Delivery 3 | CNG- Light-duty vehicles | 34 | 1 | gal (US) | 34 |
| S3- Transport | Employee Travel 1 | Passenger Car A | 12 | 1 | vehicle-mile | 3 |
| S3- Transport | Employee Travel 2 | Light-Duty Truck B | 8 | 1 | vehicle-mile | 4 |
| TOTAL | | | 231 | | | |

*Fig. 8A*

| Emissions | | | | | | |
|---|---|---|---|---|---|---|
| CO2 factor | CH4 factor | N2O factor | BIO CO2 factor | AR4 (CO2e) factor | AR5 (CO2e) factor | |
| 274.32 | 0.02 | 0.10 | 0.00 | 274.35 | 274.35 | |
| 274.32 | 0.02 | 0.10 | 0.00 | 274.35 | 274.35 | |
| 53.06 | 1.00 | 0.10 | 0.00 | 53.11 | 53.11 | |
| 94.27 | 11.00 | 1.60 | 0.00 | 95.02 | 95.00 | |
| 69.25 | 3.00 | 0.60 | 0.00 | 69.50 | 69.49 | |
| 0.00 | 0.00 | 0.00 | 0.00 | 0.00 | 0.00 | |
| 10.21 | 0.00 | 0.00 | 0.00 | 10.22 | 10.22 | |
| 0.41 | 0.09 | 0.01 | 0.00 | 4.45 | 4.51 | |
| 0.34 | 0.02 | 0.01 | 0.00 | 0.35 | 0.35 | |
| 0.47 | 0.02 | 0.02 | 0.00 | 0.48 | 0.48 | |
| 776.65 | 15.17 | 2.54 | 0.00 | 781.83 | 781.86 | |

| User Constraints | | Optimizer Output |
| --- | --- | --- |
| Source Max Value | Source Min Value | Results |
| 18 | 9 | 14 |
| 15 | 10 | 9 |
| 22 | 15 | 15 |
| 8 | 5 | 5 |
| 21 | 14 | 14 |
| 18 | 12 | 12 |
| 18 | 12 | 12 |
| 44 | 34 | 39 |
| 5 | 3 | 3 |
| 7 | 4 | 4 |

| | 2020 Costs | | Results Costs | | 2020 Emissions | | Results Emissions | |
|---|---|---|---|---|---|---|---|---|
| | 2020 Costs | 2020 % Costs | Results Costs | Results % Costs | 2020 Total Emissions | 2020 Emission % | Results Total Emissions | Results Emission % |
| | 150 | 5% | 140 | 4% | 12347.09 | 44% | 11523.95 | 43% |
| | 200 | 6% | 180 | 5% | 8231.39 | 29% | 7408.26 | 28% |
| | 300 | 9% | 300 | 9% | 2405.84 | 9% | 2405.84 | 9% |
| | 150 | 5% | 150 | 4% | 1484.47 | 5% | 1484.47 | 6% |
| | 840 | 25% | 840 | 24% | 2965.86 | 11% | 2965.86 | 11% |
| | 276 | 8% | 276 | 8% | 0.00 | 0% | 0.00 | 0% |
| | 168 | 5% | 168 | 5% | 367.73 | 1% | 367.73 | 1% |
| | 1156 | 35% | 1326 | 38% | 321.71 | 1% | 369.02 | 1% |
| | 36 | 1% | 36 | 1% | 3.20 | 0% | 3.20 | 0% |
| | 32 | 1% | 32 | 1% | 5.85 | 0% | 5.85 | 0% |
| Total | 3308 | 100% | 3448 | 100% | 28133.14 | 100% | 26534.17 | 100% |

| | 2020 Emisssions | | | | | Total 2020 Emissions |
|---|---|---|---|---|---|---|
| CO2 factor | CH4 factor | N2O factor | BIO CO2 factor | AR4 (CO2e) factor | AR5 (CO2e) factor | Total |
| 4114.80 | 0.33 | 1.50 | 0.00 | 4115.26 | 4115.21 | 12347.09 |
| 2743.20 | 0.22 | 1.00 | 0.00 | 2743.50 | 2743.47 | 8231.39 |
| 795.90 | 15.00 | 1.50 | 0.00 | 796.72 | 796.72 | 2405.84 |
| 471.35 | 55.00 | 8.00 | 0.00 | 475.11 | 475.01 | 1484.47 |
| 969.50 | 42.00 | 8.40 | 0.00 | 973.05 | 972.90 | 2965.86 |
| 0.00 | 0.00 | 0.00 | 0.00 | 0.00 | 0.00 | 0.00 |
| 122.52 | 0.00 | 0.21 | 0.00 | 122.61 | 122.60 | 367.73 |
| 13.85 | 3.04 | 0.03 | 0.00 | 151.15 | 153.47 | 321.71 |
| 1.03 | 0.06 | 0.03 | 0.00 | 1.04 | 1.04 | 3.20 |
| 1.89 | 0.08 | 0.07 | 0.00 | 1.91 | 1.91 | 5.85 |
| 9234.03 | 115.72 | 20.71 | 0.00 | 9380.35 | 9382.32 | 28133.14 |

Total

*Fig. 8E*

| | Results Emisssions | | | | Total Results Emissions |
|---|---|---|---|---|---|
| CO2 factor | CH4 factor | N2O factor | BIO CO2 factor | AR4 (CO2e) factor | AR5 (CO2e) factor | Total |
| 3840.48 | 0.31 | 1.40 | 0.00 | 3840.90 | 3840.86 | 11523.95 |
| 2468.88 | 0.20 | 0.90 | 0.00 | 2469.15 | 2469.12 | 7408.26 |
| 795.90 | 15.00 | 1.50 | 0.00 | 796.72 | 796.72 | 2405.84 |
| 471.35 | 55.00 | 8.00 | 0.00 | 475.11 | 475.01 | 1484.47 |
| 969.50 | 42.00 | 8.40 | 0.00 | 973.05 | 972.90 | 2965.86 |
| 0.00 | 0.00 | 0.00 | 0.00 | 0.00 | 0.00 | 0.00 |
| 122.52 | 0.00 | 0.24 | 0.00 | 122.61 | 122.60 | 367.73 |
| 15.88 | 3.48 | 0.03 | 0.00 | 173.38 | 176.03 | 369.02 |
| 1.03 | 0.06 | 0.03 | 0.00 | 1.04 | 1.04 | 3.20 |
| 1.89 | 0.08 | 0.07 | 0.00 | 1.91 | 1.91 | 5.85 |
| 8687.43 | 116.12 | 20.54 | 0.00 | 8853.88 | 8856.20 | 26534.17 |
| | | | | | | Total |

| Category | Business Usage | Emission Source | Price/Unit | Unit Size | Unit | 2020 Units (R) | Target Constraint | Total Emissions |
|---|---|---|---|---|---|---|---|---|
| | | | | | 2020 | | | |
| Fuel Type | Restaurant Heater | Blast Furnace Gas | 10 | 1 | mmBTU | 13 | >10 | 10,701 |
| Fuel Type | Pizza Oven | Blast Furnace Gas | 20 | 1 | mmBTU | 10 | >6 | 8,231 |
| Fuel Type | Kitchen | Natural Gas | 20 | 1 | mmBTU | 15 | | 2,406 |
| Fuel Type | Office Building | Mixed (Commercial Sector) | 30 | 1 | mmBTU | 5 | | 1,484 |
| S1- Mobile Combustion | Business Travel | Aviation Gasoline - Aviation Gasoline Aircraft | 60 | 1 | gal (US) | 14 | <=12 | 2,966 |
| S1- Mobile Combi Delivery 1 | | Electricity- Mobile - Electric Vehicle | 23 | 1 | gal (US) | 12 | <=18 | - |
| S1- Mobile Combi Delivery 2 | | Diesel Fuel - Light duty trucks | 14 | 1 | gal (US) | 12 | <=11 | 368 |
| S1- Mobile Combi Delivery 3 | | CNG- Light-duty vehicles | 34 | 1 | gal (US) | 34 | <=3 | 322 |
| S3- Transport | Employee Travel 1 | Passenger Car A | 12 | 1 vehicle-mile | | 3 | <=3 | 3 |
| S3- Transport | Employee Travel 2 | Light-Duty Truck B | 8 | 1 vehicle-mile | | 4 | <=4 | 6 |
| TOTAL | | | | | | | | 26486.862 |

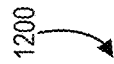

*Fig. 12A*

| Category | Business Usage | Emission Source | Without Optimization | | | With Optimization | | | 
|---|---|---|---|---|---|---|---|---|
| | | | Price/Unit | 2021 Units | Total Emissions | Price/Unit | 2021 Units | Total Emissions |
| Fuel Type | Restaurant Heater | Blast Furnace Gas | 13 | 15 | 10,701 | 13 | 12 | 11,524 |
| Fuel Type | Pizza Oven | Blast Furnace Gas | 19 | 12 | 8,231 | 19 | 9 | 6,585 |
| Fuel Type | Kitchen | Natural Gas | 18 | 23 | 2,406 | 18 | 21 | 1,925 |
| Fuel Type | Office Building | Mixed (Commercial Sector) | 32 | 6 | 1,484 | 32 | 6 | 1,781 |
| S1- Mobile Combustion | Business Travel | Aviation Gasoline - Aviation Gasoline Aircraft | 65 | 13 | 2,966 | 65 | 12 | 2,330 |
| S1- Mobile Combustion | Delivery 1 | Electricity- Mobile - Electric Vehicle | 23 | 15 | - | 23 | 15 | - |
| S1- Mobile Combustion | Delivery 2 | Diesel Fuel - Light duty trucks | 12 | 11 | 368 | 12 | 11 | 276 |
| S1- Mobile Combustion | Delivery 3 | CNG- Light-duty vehicles | 33 | 34 | 322 | 33 | 34 | 246 |
| S3- Transport | Employee Travel 1 | Passenger Car A | 14 | 3 | 3 | 14 | 3 | 2 |
| S3- Transport | Employee Travel 2 | Light-Duty Truck B | 9 | 4 | 6 | 9 | 4 | 4 |
| | TOTAL | | | | 26,487 | | | 24,674 |

*Fig. 12B*

| Category | Business Usage | Emission Source | Total (2021+2022) Emissions | |
|---|---|---|---|---|
| | | | Without Optimization | With Optimization |
| Fuel Type | Restaurant Heater | Blast Furnace Gas | 21,402 | 23,871 |
| Fuel Type | Pizza Oven | Blast Furnace Gas | 16,463 | 13,170 |
| Fuel Type | Kitchen | Natural Gas | 4,812 | 3,849 |
| Fuel Type | Office Building | Mixed (Commercial Sector) | 2,969 | 3,563 |
| S1- Mobile Combustion | Business Travel | Aviation Gasoline - Aviation Gasoline Aircraft | 5,932 | 4,661 |
| S1- Mobile Combustion | Delivery 1 | Electricity- Mobile - Electric Vehicle | - | - |
| S1- Mobile Combustion | Delivery 2 | Diesel Fuel - Light duty trucks | 735 | 552 |
| S1- Mobile Combustion | Delivery 3 | CNG- Light-duty vehicles | 643 | 492 |
| S3- Transport | Employee Travel 1 | Passenger Car A | 6 | 4 |
| S3- Transport | Employee Travel 2 | Light-Duty Truck B | 12 | 9 |
| | | TOTAL | 52,974 | 50,171 |

*Fig. 12C*

GENERATING FORECASTED EMISSIONS VALUE MODIFICATIONS AND MONITORING FOR PHYSICAL EMISSIONS SOURCES UTILIZING MACHINE-LEARNING MODELS

CROSS-REFERENCE TO RELATED APPLICATIONS

This application claims priority to, and the benefit of, U.S. Provisional Patent Application No. 63/262,200, filed Oct. 7, 2021, which is incorporated herein by reference in its entirety.

BACKGROUND

Increases in prevalence of technological and manufacturing processes over recent decades—in addition to increasing population numbers—have led to increasing levels of greenhouse gas emissions, leading to a rapidly changing climate. As a result, many countries and organizations are increasing emissions measuring and reporting regulations for various entities based on internal and external operations of the entities. Because many entities (even small businesses) generate substantial amounts of emissions of various types from potentially hundreds of different sources, determining overall emissions from previous time periods can be a very complex and difficult problem. Furthermore, determining future emissions based on growth or other changes to entity operations given the number of emission types and sources given various constraints is also challenging. Given the emergent nature of emissions standards and reporting, conventional systems are unable to monitor emissions from large numbers of sources while also modeling future emissions under a number of different constraints.

SUMMARY

This disclosure describes one or more embodiments of methods, non-transitory computer readable media, and systems that solve the foregoing problems (in addition to providing other benefits) by generating action recommendations for modifying physical emissions sources of an entity based on forecasting and monitoring emissions production for the entity utilizing machine-learning models. Specifically, the disclosed systems forecast emissions produced by an entity by utilizing a plurality of different forecasting machine-learning models corresponding to different physical emissions sources to generate forecasted source attributes and usage. Additionally, the disclosed systems combine the forecasted source attributes to generate a plurality of forecasted emissions value modifications for a future time period. The disclosed systems generate action recommendations for modifying the physical emissions sources based on the forecasted emissions value modifications. In additional embodiments, the disclosed systems track emissions of the entity during the future time period and generate additional action recommendations in response to detecting deviations from forecasted emissions production. In some embodiments, the disclosed systems also utilize the action recommendations to modify the physical emissions sources. The disclosed systems thus utilize a plurality of machine-learning models to efficiently, accurately, and flexibly monitor and forecast emissions production of an entity for one or more future time periods.

BRIEF DESCRIPTION OF THE DRAWINGS

Various embodiments will be described and explained with additional specificity and detail through the use of the accompanying drawings in which:

FIGS. 8A-8F illustrate chart diagrams of past data and modeled data for physical emissions sources corresponding to an entity in accordance with one or more implementations.

FIGS. 12A-12C illustrate chart diagrams of past data and forecasted data for physical emissions sources corresponding to an entity in accordance with one or more implementations.

DETAILED DESCRIPTION

Figure 1:
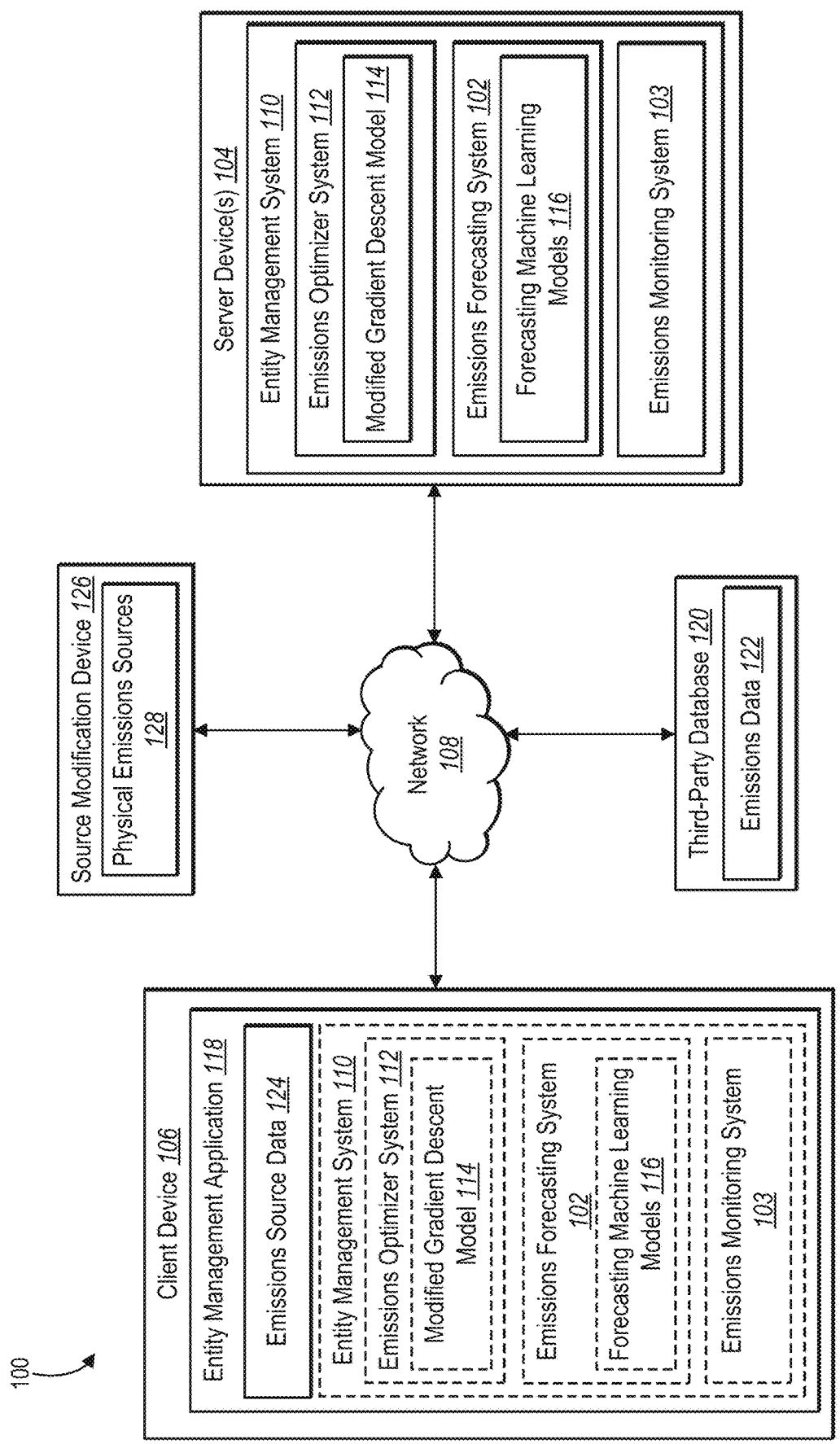
FIG. 1 illustrates an example of a system environment in which an emissions optimizer system, an emissions forecasting system, and an emissions monitoring system can operate in accordance with one or more implementations.

This disclosure describes one or more embodiments of an emissions forecasting system that utilizes a plurality of forecasting machine-learning models to generate action recommendations based on forecasted emissions usage of an entity and an emissions monitoring system to monitor performance relative to forecasted emissions usage. In one or more embodiments, the emissions forecasting system utilizes source-specific forecasting machine-learning models to generate forecasted source attributes and usage of the physical emissions sources for a future time period according to a set of constraints and historical data associated with the entity. The emissions forecasting system utilizes the forecasted source attributes to determine forecasted emissions value modifications for the physical emissions sources. Additionally, the emissions forecasting system generates action recommendations to provide to the entity for modifying the physical emissions sources and reduce emissions produced by the entity and usage of the physical emissions sources according to the forecasted data. In additional embodiments, the emissions monitoring system monitors emissions generated by the entity during the future time period and provides action recommendations to correct deviations from the forecasted emissions production. The emissions monitoring system utilizes historical data in connection with the forecasted data to provide real-time alerts.

As mentioned, in one or more embodiments, the emissions forecasting system generates forecasted source attributes for a plurality of physical emissions sources corresponding to an entity for one or more future time periods. Specifically, the emissions forecasting system determines forecasting machine-learning models for the physical emissions sources based on attributes of historical data associated with the physical emissions sources. The emissions forecasting system utilizes the selected forecasting machine-learning models to generate forecasted source attributes for the physical emissions sources based on constraints and historical data associated with the entity. In some embodiments, the emissions forecasting system generates the forecasted source attributes based on results provided by an emissions optimizer system according to specific target emissions values for the entity.

In one or more embodiments, the emissions forecasting system determines forecasted emissions value modifications from the forecasted source attributes. For instance, the emissions forecasting system utilizes a model that generates the forecasted emissions value modifications by weighting the forecasted source attributes generated by the individual forecasted machine-learning models. Additionally, the emissions forecasting system generates the forecasted emissions value modifications based on the constraints and/or emissions value modifications generated by the emissions optimizer system.

According to one or more embodiments, the emissions forecasting system generates action recommendations for modifying physical emissions sources corresponding to an entity based on forecasted emissions value modifications. In particular, the emissions forecasting system determines forecasted emissions value modifications for one or more time periods and generates action recommendations for meeting forecasted emissions production or usage of physical emissions sources. In additional embodiments, the emissions forecasting system also utilizes constraints associated with the entity to generate the action recommendations consistent with goals and/or limitations for the entity such as emissions or cost goals.

Furthermore, in some embodiments, the emissions monitoring system monitors emissions produced by an entity for comparison to forecasted emissions. To illustrate, the emissions monitoring system tracks emissions produced by physical emissions sources corresponding to the entity during a future time period. The emissions monitoring system determines whether the tracked emissions deviate from a plan (e.g., the forecasted emissions value modifications) corresponding to the physical emissions sources. In response to detecting deviations, the emissions monitoring system generates one or more additional action recommendations to correct for the deviations.

As mentioned, conventional systems have a number of shortcomings in relation to managing and modeling emissions associated with entity operations. For example, some conventional systems for controlling the operations of physical emissions sources rely on tools that track data such as inventory, labor, or other aspects of entity operations. While such conventional systems provide useful insights regarding such emissions, the conventional systems are unequipped to configure emissions sources for compliance with recent emissions standards or to manage emissions measuring and reporting according to recent emissions standards. Due to the inability of conventional systems to track or model emissions sources and emissions production, entities attempting to control the operations of emissions sources consistently with operational goals via conventional systems must manually monitor emissions sources. Given the large number of physical emissions sources (and different types of emissions sources) and other variables involved with tracking and modeling emissions for even small entities, however, manually tracking and/or predicting emissions via conventional systems is inefficient and inaccurate.

The disclosed emissions optimizer system, emissions forecasting system, and emissions monitoring system provide a number of advantages over conventional systems. For example, the emissions forecasting system provides flexibility for computing systems that control operations of physical emissions sources by tracking and modeling emissions produced by large numbers of various physical emissions sources for an entity. In particular, in contrast to conventional systems that are unable to configure emissions sources (thus requiring manual monitoring and configuration by entities), the emissions forecasting system automatically tracks and forecasts usage and/or emissions values for past and future time periods for different types of entities with different emissions sources. To illustrate, by managing an entity's emissions consistent with other operational data of the entity, the emissions optimizer system provides up-to-date, detailed emissions data that allows entity's to easily generate a plan for reducing emissions. The emissions optimizer system also provides optimal parameters for an entity's business or financial constraints while achieving specified emissions and cost goals. In addition, the emissions optimizer system is able to automatically determine whether a solution is possible given the various constraints and goals and suggests various modifications to the constraints or goals to obtain a solution. Additionally, the emissions forecasting system also provides additional flexibility by forecasting emissions data for different datasets and various combinations of future time periods. The emissions monitoring system also detects deviations of emissions from forecast goals on a regular basis based on data collected from users and/or other systems. By evaluating emissions values based on the data and comparing the data with the forecast goals, the entity mapping system is able to quickly provide updated recommendations for correcting the deviations in emissions usage.

Furthermore, the emissions optimizer system, emissions forecasting system, and emissions monitoring system also improves efficiency of computing systems for controlling operations of emissions sources. Specifically, the emissions forecasting system utilizes a plurality of source-specific forecasting machine-learning models to accurately and efficiently forecast source attributes for large numbers of emissions sources for applying modifications to operations of emissions sources for future time periods. For example, the emissions forecasting system utilizes a plurality of machine-learning models to generate forecasted emissions data for various physical emissions sources according to weights (e.g., contribution proportions) corresponding to the physical emissions sources. Additionally, the emissions forecasting system generates action recommendations for implementing emissions value modifications to specific physical emissions sources while taking additional variables (e.g., target emissions values and various constraints) into account that otherwise significantly increase the complexity of an optimization process with conventional systems. Furthermore, the emissions monitoring system monitors deviations from a forecasted plan to provide updated/adjusted recommendations or alerts in response to determining that an entity changes its emissions usage over time relative to target emissions usage.

Additionally, the emissions optimizer system, the emissions forecasting system, and the emissions monitoring system also provides improved accuracy for computing systems that control emissions sources. For example, the emissions optimizer system provides configuration of a plurality of physical emissions sources by utilizing a multi-variable objective algorithm (e.g., a mixed-integer programming algorithm such as a modified gradient descent model) to iteratively process emissions values for a plurality of emissions sources given defined constraints and one or more target emissions values. The emissions forecasting system also selects machine-learning models to use for a plurality of different physical emissions sources based on the availability, type, or other attributes of historical data associated with the physical emissions sources. Accordingly, the emissions forecasting system selects appropriate models for accurately generating forecasted emissions data for the different physical emissions sources based on the available data. The emissions forecasting system thus accurately determines specific actions for modifying operations of physical emissions sources to achieve specific goals while complying with the various constraints in a number of different scenarios. Additionally, even if the entity misses target emissions usage for a portion of a future time period, the emissions monitoring system utilizes real-time monitoring of the entity's emissions usage for providing alerts and updated accurate forecasting to account for deviations.

Turning now to the figures, FIG. 1 includes an embodiment of a system environment 100 in which an emissions forecasting system 102 and an emissions monitoring system 103 are implemented. In particular, the system environment 100 includes server device(s) 104 and a client device 106 in communication via a network 108. Moreover, as shown, the server device(s) 104 include an entity management system 110, which includes the emissions forecasting system 102, the emissions monitoring system 103, and an emissions optimizer system 112. As further illustrate in FIG. 1, the emissions optimizer system 112 includes a modified gradient descent model 114. Furthermore, the emissions forecasting system 102 includes a plurality of forecasting machine-learning models 116. Additionally, the client device 106 includes an entity management application 118, which optionally includes the entity management system 110, the emissions forecasting system 102 (including the forecasting machine-learning models 116), and the emissions optimizer system 112 (including the modified gradient descent model 114). In additional embodiments, as illustrated in FIG. 1, the system environment 100 includes a third-party database 120, which includes emissions data 122. In further embodiments, the system environment 100 includes a source modification device 126, which manages operations for physical emissions sources 128.

As shown in FIG. 1, in one or more implementations, the server device(s) 104 includes or hosts the entity management system 110. Specifically, the entity management system 110 includes, or is part of, one or more systems that implement management of entity operations. For example, the entity management system 110 provides tools for generating, viewing, or otherwise interacting with operational data (e.g., inventory, labor, emissions data) associated with an entity. To illustrate, the entity management system 110 communicates with the client device 106 via the network 108 to provide the tools for display and interaction via the entity management application 118 at the client device 106. Additionally, in some embodiments, the entity management system 110 receives data from the client device 106 in connection with managing operational data associated with the entity, including requests to perform operations based on digital content stored at the server device(s) 104 (or at another device such as a source repository) and/or requests to store digital content from the client device 106 at the server device(s) 104 (or at another device). In some embodiments, the entity management system 110 receives interaction data for generating or viewing operational data based on digital content (e.g., emissions source data 124) at the client device 106, processes the interaction data (e.g., to generate or edit operational data), and provides the results of the interaction data to the client device 106 for display via the entity management application 118 or to a third-party system.

In one or more embodiments, the entity management system 110 provides tools for generating operational data (including emissions data) for an entity. In particular, the entity management system 110 provides tools (e.g., via the entity management application 118) for selecting, viewing, or generating emissions data or action recommendations corresponding to the emissions data. Additionally, the entity management system 110 utilizes the emissions optimizer system 112 to intelligently generate action recommendations for modifying physical emissions sources corresponding to an entity based on the emissions source data 124 provided by the client device. The emissions optimizer system 112 also utilizes a database (e.g., the third-party database 120) including emissions data 122 (e.g., based on a standard emissions protocol) for determining emissions values corresponding to the emissions source data 124. For example, the emissions optimizer system 112 utilizes the modified gradient descent model 114 to iteratively adjust emissions values based on the emissions source data 124 according to on one or more target values. Furthermore, in one or more embodiments, the emissions optimizer system 112 utilizes the modified gradient descent model 114 to generate the action recommendations based on a plurality of constraints provided to the entity management system 110 (e.g., from the client device 106).

In additional embodiments, the entity management system 110 utilizes the emissions forecasting system 102 to intelligently forecast emissions production for an entity. Specifically, the emissions forecasting system 102 utilizes the plurality of forecasting machine-learning models 116 to generate forecasted emissions value modifications for a plurality of physical emissions sources corresponding to the entity. By forecasting emissions production of the entity for one or more future time periods utilizing the forecasting machine-learning models 116, the emissions forecasting system 102 generates an emissions plan (e.g., via one or more action recommendations) for modifying physical emissions sources.

In one or more embodiments, after the emissions optimizer system 112 and the emissions forecasting system 102 generate action recommendations for modifying physical emissions sources associated with an entity, the entity management system 110 provides the action recommendations to the client device 106 for display. For instance, the entity management system 110 sends the action recommendations to the client device 106 via the network 108 for display via the entity management application 118. Additionally, the emissions forecasting system 102 and/or the emissions monitoring system 103 can receive additional inputs to apply additional changes to the emissions source data 124, constraints, and/or target emissions values or to update forecasted data. To illustrate, the client device 106 can provide tracked emissions data corresponding to the entity during a time period for the emissions monitoring system 103 to utilize in detecting deviations from forecasted data. The entity management system 110 utilizes the emissions optimizer system 112, the emissions forecasting system 102, and/or the emissions monitoring system 103 to generate additional action recommendations based on the updated emissions source data 124, constraints, and/or target emissions values or for additional forecasted data.

According to one or more embodiments, the entity management system 110, the emissions optimizer system 112, the emissions forecasting system 102, the emissions monitoring system 103, and/or the client device 106 provide instructions for implementing one or more actions based on the action recommendations to the source modification device 126 (or a plurality of source modification devices). To illustrate, in response to a user interaction via the client device 106 to select one or more action recommendations, the client device 106, the emissions optimizer system 112, the emissions forecasting system 102, or the emissions monitoring system 103 sends instructions to the source modification device 126 to perform one or more corresponding operations for modifying the physical emissions sources 128. The source modification device 126 performs the operation(s) by modifying the physical emissions sources 128, such as by establishing/modifying control limits that limit operations of one or more physical emissions sources (e.g., setting automatic time limits, turning on/off specific sources, restricting use based on time/usage thresholds, controlling gas/electricity flow, travel budget availability for employees).

In additional embodiments, the server device(s) 104 provide source modification instructions directly to the source modification device 126 such that the source modification device 126 automatically applies the modifications to the physical emissions sources 128. Accordingly, the source modification device 126 includes devices or machinery that modify operations associated with the physical emissions sources 128. In one or more embodiments, the source modification device 126 includes a computing device (or other physical control device including a processor) for executing instructions related to controlling the physical emissions sources 128.

Specifically, in one or more embodiments, the emissions optimizer system 112 sends instructions to the source modification device 126 (a controller, a central processing device, a thermostat, etc.) to modify operations of a physical emissions source 128 (e.g., an oven, an HVAC system, a furnace, a boiler, a water heater, light bulbs, etc.). For example, the emissions optimizer system 112 or the emissions monitoring system 103 sends instructions to source modification device 126 to limit operation of a physical emissions source 128 to certain hours during the day, to a certain number of hours a day, or to stay within one or more operating parameters (e.g., minimum/maximum temperature, minimum/maximum speed, minimum/maximum power).

In one or more embodiments, the server device(s) 104 include a variety of computing devices, including those described below with reference to FIG. 15. For example, the server device(s) 104 includes one or more servers for storing and processing data associated with operational data, emissions data, and action recommendations for modifying physical emissions sources for an entity. In some embodiments, the server device(s) 104 also include a plurality of computing devices in communication with each other, such as in a distributed storage environment. In some embodiments, the server device(s) 104 include a content server. The server device(s) 104 also optionally includes an application server, a communication server, a web-hosting server, a social networking server, a digital content campaign server, or a digital communication management server.

In addition, as shown in FIG. 1, the system environment 100 includes the client device 106. In one or more embodiments, the client device 106 includes, but is not limited to, a mobile device (e.g., smartphone or tablet), a laptop, a desktop, including those explained below with reference to FIG. 15. Furthermore, although not shown in FIG. 1, the client device 106 can be operated by a user (e.g., a user included in, or associated with, the system environment 100) to perform a variety of functions. In particular, the client device 106 performs functions such as, but not limited to, accessing, viewing, and interacting with digital content (e.g., emissions source data, emissions data, action recommendations). In some embodiments, the client device 106 also performs functions for generating, capturing, or accessing data to provide to the entity management system 110 and the emissions optimizer system 112 in connection with entity management. For example, the client device 106 communicates with the server device(s) 104 via the network 108 to provide information (e.g., user interactions) associated with generating action recommendations. Although FIG. 1 illustrates the system environment 100 with a single client device 106, in some embodiments, the system environment 100 includes a different number of client devices.

Additionally, as shown in FIG. 1, the system environment 100 includes the network 108. The network 108 enables communication between components of the system environment 100. In one or more embodiments, the network 108 may include the Internet or World Wide Web. Additionally, the network 108 can include various types of networks that use various communication technology and protocols, such as a corporate intranet, a virtual private network (VPN), a local area network (LAN), a wireless local network (WLAN), a cellular network, a wide area network (WAN), a metropolitan area network (MAN), or a combination of two or more such networks. Indeed, the server device(s) 104 and the client device 106 communicates via the network using one or more communication platforms and technologies suitable for transporting data and/or communication signals, including any known communication technologies, devices, media, and protocols supportive of data communications, examples of which are described with reference to FIG. 15.

Although FIG. 1 illustrates the server device(s) 104 and the client device 106 communicating via the network 108, in alternative embodiments, the various components of the system environment 100 communicate and/or interact via other methods (e.g., the server device(s) 104 and the client device 106 can communicate directly). Furthermore, although FIG. 1 illustrates the emissions optimizer system 112 and the emissions forecasting system 102 being implemented by a particular component and/or device within the system environment 100, the emissions optimizer system 112 and/or the emissions forecasting system 102 can be implemented, in whole or in part, by other computing devices and/or components in the system environment 100 (e.g., the client device 106).

In particular, in some implementations, the emissions optimizer system 112 on the server device(s) 104 supports the emissions optimizer system 112, the emissions forecasting system 102, and the emissions monitoring system 103 on the client device 106. For instance, the emissions optimizer system 112, the emissions forecasting system 102, and/or the emissions monitoring system 103 on the server device(s) 104 generates or trains the emissions optimizer system 112 (e.g., the modified gradient descent model 114), the emissions forecasting system 102 (e.g., the forecasting machine-learning models 116), and/or the emissions monitoring system 103 for the client device 106. The server device(s) 104 provides the generated/trained emissions optimizer system 112 and/or the generated/trained emissions forecasting system 102 to the client device 106. In other words, the client device 106 obtains (e.g., downloads) the emissions optimizer system 112, the emissions forecasting system 102, and/or the emissions monitoring system 103 from the server device(s) 104. At this point, the client device 106 is able to utilize the emissions optimizer system 112, the emissions forecasting system 102, and/or the emissions monitoring system 103 to generate operational/emissions data and action recommendations independently from the server device(s) 104.

In alternative embodiments, the emissions optimizer system 112, the emissions forecasting system 102, and/or the emissions monitoring system 103 includes a web hosting application that allows the client device 106 to interact with content and services hosted on the server device(s) 104. To illustrate, in one or more implementations, the client device 106 accesses a web page supported by the server device(s) 104. The client device 106 provides input to the server device(s) 104 to perform emissions data and action recommendation generation operations, and, in response, the emissions optimizer system 112, the emissions forecasting system 102, the emissions monitoring system 103, or the entity management system 110 on the server device(s) 104 performs operations to generate emissions data and action recommendations. The server device(s) 104 provide the output or results of the operations to the client device 106.

Figure 2:
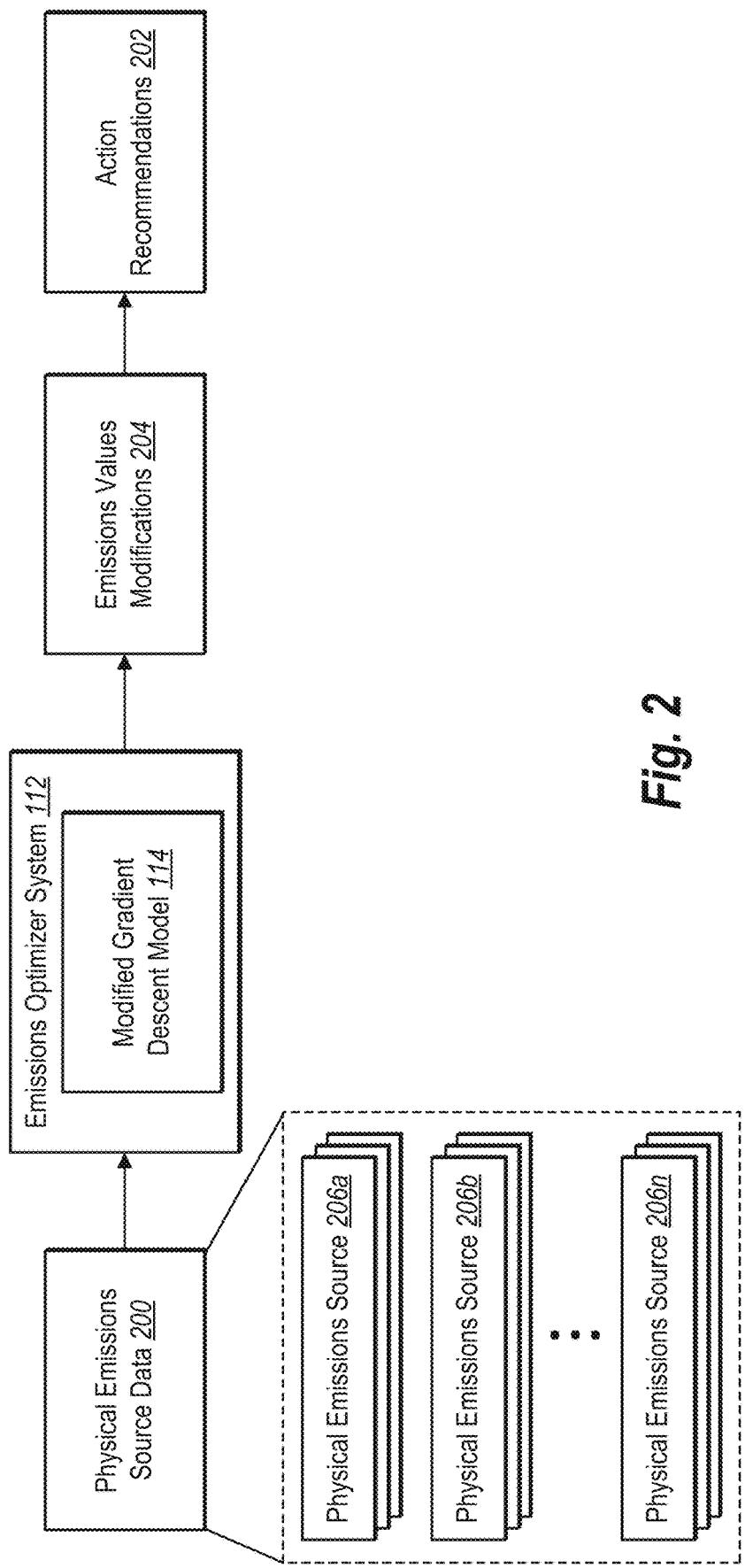
FIG. 2 illustrates an example of an overview of a process of the emissions optimizer system utilizing a modified gradient descent model to generate action recommendations for modifying physical emissions sources in accordance with one or more implementations.

As mentioned, the emissions optimizer system 112 utilizes data indicating emissions produced by an entity to generate action recommendations for modifying one or more physical emissions sources. FIG. 2 illustrates an overview of the emissions optimizer system 112 processing physical emissions source data 200 to generate action recommendations 202. Specifically, the emissions optimizer system 112 utilizes the modified gradient descent model 114 to generate emissions values modifications 204 from the physical emissions source data 200. The emissions optimizer system 112 generates the action recommendations 202 from the emissions values modifications 204.

In one or more embodiments, the emissions optimizer system 112 determines the physical emissions source data 200 in connection with a plurality of physical emissions sources for an entity. For example, the physical emissions source data 200 includes a number and a type of each of a plurality of physical emissions sources corresponding to the entity. FIG. 2 illustrates that the physical emissions source data 200 includes data associated with a plurality of physical emissions source 206a-206n. To illustrate, the physical emissions source data 200 includes a number of units of a first physical emissions source 206a. The physical emissions source data 200 can also include a source type of the first physical emissions source 206a.

In one or more embodiments, a physical emissions source (or "emissions source") includes an object, substance, or action that produces physical emissions. For instance, a physical emissions source includes actions such as, but not limited to, objects, substances, or actions related to travel by employees of an entity or delivery drivers utilizing transportation vehicles (e.g., cars, trucks, airplanes) that the entity may or may not own. In additional examples, a physical emissions source includes objects or substances such as, but not limited to, utilities (e.g., electricity, natural gas, water) on properties owned or used by an entity, vehicles owned or used by an entity, gases or fuels used by furnaces or heating elements, cooking tools such as stoves or ovens, manufacturing tools including assembly lines or individual parts of an assembly line, or agricultural byproducts that generate physical emissions.

According to one or more embodiments, emissions (or "physical emissions") include specific substances generated or produced by one or more sources. For example, emissions include specific gases or liquids. To illustrate, the emissions optimizer system 112 determines emissions that are categorized as greenhouse gases that absorb and emit radiant energy within a thermal infrared range and are correlated with (or cause) the greenhouse effect in relation to climate change. Specifically, physical emissions include various factors such as, but not limited to, carbon dioxide, methane, nitrous oxide, water vapor, or ozone. Additionally, in one or more embodiments, the emissions optimizer system 112 determines various climate change factors based on physical emissions recognized in emissions standards including, but not limited to, a CO2 factor, a CH4 factor, a N2O factor, a BIO CO2 factor, an AR4 (CO2e) factor, and an AR5 (CO2e) factor.

Furthermore, in one or more embodiments, the emissions optimizer system 112 utilizes the modified gradient descent model 114 to generate the emissions values modifications 204 based on adjustments to emissions values corresponding to the physical emissions source data 200. Specifically, as described in more detail with respect to FIG. 3 and FIG. 4, the emissions optimizer system 112 utilizes the modified gradient descent model 114 to iteratively adjust emissions values for different physical emissions sources to attempt to achieve one or more target emissions values. Additionally, the emissions optimizer system 112 generates the action recommendations 202 based on the emissions values modifications 204 to provide to the entity.

Figure 3:
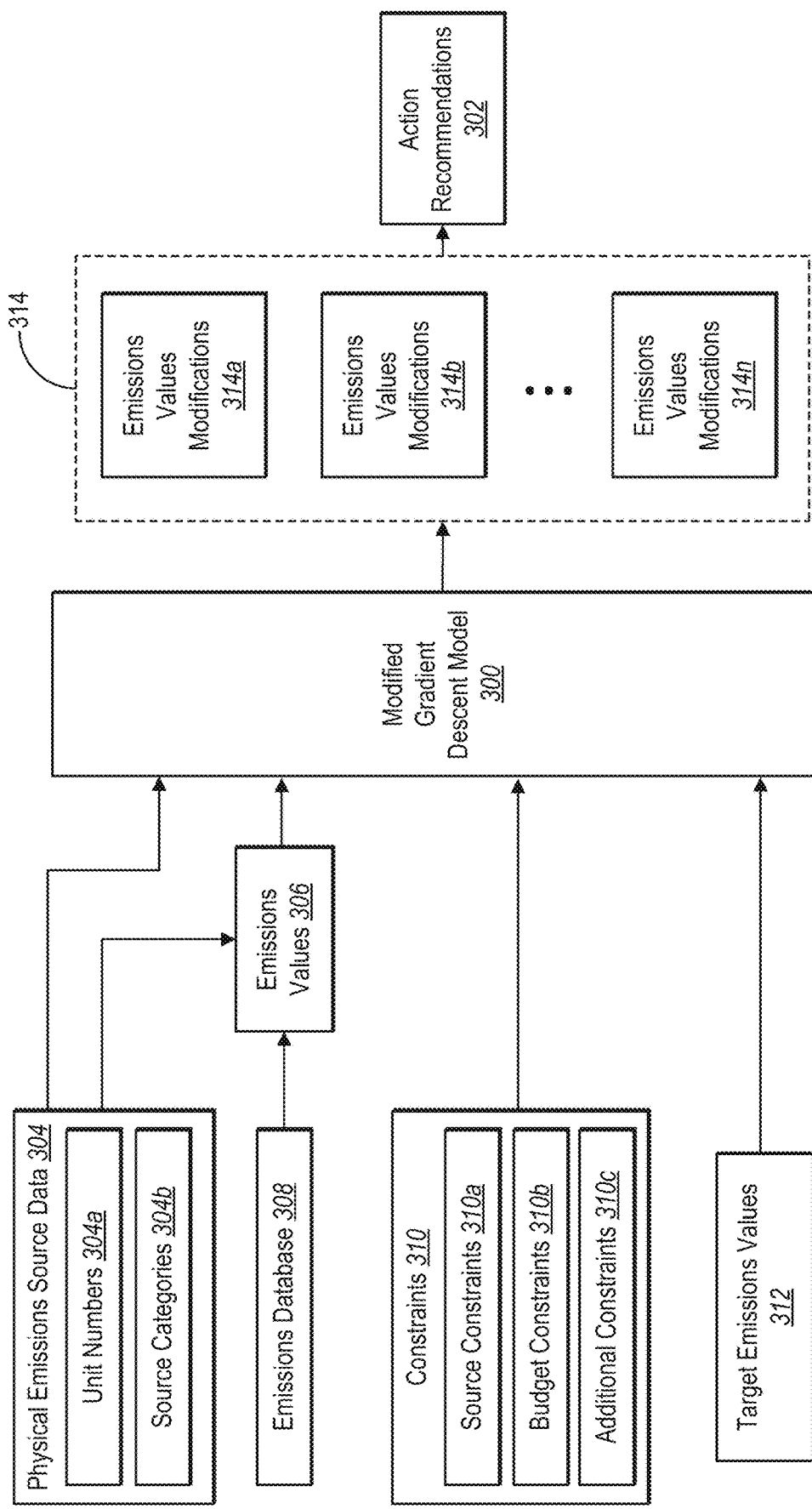
FIG. 3 illustrates an example of a detailed process of the emissions optimizer system utilizing a modified gradient descent model to generate action recommendations for modifying physical emissions sources in accordance with one or more implementations.

FIG. 3 illustrates a diagram of a detailed process of the emissions optimizer system generating action recommendations for modifying physical emissions sources corresponding to an entity. In particular, the emissions optimizer system 112 utilizes a modified gradient descent model 300 to determine one or more actions that the entity may perform to achieve one or more emissions goals given various constraints. For example, the emissions optimizer system 112 utilizes the modified gradient descent model 300 to generate action recommendations 302 to modify physical emissions for meeting the emissions goals.

As illustrated in FIG. 3, the emissions optimizer system 112 determines physical emissions source data 304 for physical emissions sources corresponding to an entity. For example, the emissions optimizer system 112 determines unit numbers 304a indicating a number of units of each physical emissions source type. To illustrate, the emissions optimizer system 112 determines how many delivery drivers are associated with the entity, how many miles the delivery drivers drive during a given time period (e.g., daily, monthly, or yearly), a number of cooking or manufacturing units are associated with the entity, etc. The emissions optimizer system 112 thus determines how many units of a given emissions source the entity uses (or is associated with) during operations of the entity.

In addition to the unit numbers 304a, the emissions optimizer system 112 also determines source categories 304b corresponding to the plurality of physical emissions sources. In some embodiments, each source category produces a specific amount of emissions of one or more emission types. For instance, the emissions optimizer system 112 determines a source category for each physical emissions source based on a source type of the physical emissions source. To illustrate, the emissions optimizer system 112 determines a first source category for a first physical emissions source, a second source category for a second physical emissions source, etc. In additional embodiments the emissions optimizer system 112 determines a plurality of different physical emissions sources for a single source category. Accordingly, the emissions optimizer system 112 assigns a corresponding source category to each unit of a particular type of physical emissions source.

According to one or more embodiments, the emissions optimizer system 112 determines emissions values 306 based on the physical emissions source data 304. Specifically, the emissions optimizer system 112 accesses an emissions database 308 including data for determining how the emissions production of each unit of a particular physical emissions source. To illustrate, the emissions optimizer system 112 accesses the emissions database 308 from a third-party system that determines emissions values according to a standard emissions protocol (e.g., a greenhouse gas protocol "GHG"). In some embodiments, the emissions optimizer system 112 the emissions database 308 includes data indicating emissions values of a plurality of emission types for each unit of each source category. Thus, the emissions optimizer system 112 determines total emissions values produced by the physical emissions sources corresponding to the entity by utilizing the unit numbers 304a, the source categories 304b, and the emissions database 308.

In one or more embodiments, the emissions optimizer system 112 also determines constraints 310 in connection with modifying physical emissions sources for an entity. In particular, the constraints 310 include indications of requirements or limitations that determine boundaries for modifying physical emissions sources. As illustrated in FIG. 3, the constraints 310 include source constraints 310a, budget constraints 310b, and additional constraints 310c. For instance, the source constraints 310a indicate requirements of numbers or types of physical emissions sources (e.g., a minimum unit number of one or more physical emissions sources or source categories). In one or more embodiments, the source constraints 310a indicate that an entity has goals that require a certain number of units of one or more emissions sources. Additionally, the source constraints 310a can include business constraints related to expansion plans for meeting future sales/operational targets that the entity does not want to compromise (e.g., expanding from 10 locations to 20 locations within 2 years).

In one or more embodiments, the budget constraints 310b include financial requirements of operations. For example, the budget constraints 310b indicate that an entity has certain financial capabilities for implementing changes related to reducing emissions. To illustrate, the budget constraints 310b can include one or more budget limitations for adding or replacing physical emissions sources, such as a budget limitation for replacing a limited number of gas powered vehicles with electric vehicles.

In some embodiments, the additional constraints 310c include other constraints not covered by the source constraints 310a or the budget constraints 310b. Specifically, an entity may have certain operations or actions that the entity does not want to compromise. For instance, an entity may have a certain amount of travel that entity leadership or employees are required to perform within a specific time period that limits the amount of travel reduction available for reducing emissions. The additional constraints 310c can also indicate constraints based on obligations that the entity has with one or more other entities.

In one or more embodiments, the emissions optimizer system 112 determines the physical emissions source data 304, the constraints 310, and/or the target emissions values 312 based on user-defined values. For example, the emissions optimizer system 112 determines the physical emissions source data 304, the constraints 310, and/or the target emissions values 312 based on user input provided via one or more client devices associated with the entity. In some instances, the emissions optimizer system 112 also utilizes default values for the physical emissions source data 304, the constraints 310, and/or the target emissions values 312.

In alternative embodiments, the emissions optimizer system 112 automatically determines the physical emissions source data 304, the constraints 310, and/or the target emissions values 312. To illustrate, the emissions optimizer system 112 utilizes a machine-learning model that processes entity data (e.g., operations data) indicating details associated with the entity. The emissions optimizer system 112 determines the physical emissions source data 304, the constraints 310, and/or the target emissions values 312 by estimating numbers of physical emissions sources, future/target physical emissions sources, and/or target emissions values. The emissions optimizer system 112 can also utilize data associated with similar entities to generate estimates of the physical emissions source data 304, the constraints 310, and/or the target emissions values 312.

For example, the emissions optimizer system 112 utilizes a neural network (e.g., a convolutional neural network, recurrent neural network, deep neural network) to generate features representing an entity and a plurality of additional entities (e.g., based on the entity data). The neural network can determine a similarity between the entity and additional entities (e.g., via entity/feature matching). In one or more embodiments, the emissions optimizer system 112 determines physical emissions source data, constraints, and/or target emissions values for the entity based on one or more similar entities.

In one or more embodiments, the emissions optimizer system 112 utilizes the neural network to determine a similarity between the entity and one or more additional entities. For instance, the emissions optimizer system 112 obtains a plurality of attributes of each entity including, but not limited to, entity size, entity type, entity profits/expenses, location, or operations data. The emissions optimizer system 112 utilizes the neural network to encode the attributes (and any learned relationships among the attributes) to generate feature vectors representing the entities. The emissions optimizer system 112 determines similar entities based on distances between the feature vectors (e.g., based on the distances between feature vectors in a feature space). In one or more implementations, the emissions optimizer system 112 determines that the smaller the distance between feature vectors in the features space the greater the similarity between the entities represented by the feature vectors.

In response to determining one or more similar entities to the entity, the emissions optimizer system 112 determines the physical emissions source data, constraints, and/or target emissions values for the entity based on entity data associated with the similar entity/entities. In particular, the emissions optimizer system 112 retrieves entity data from a similar entity and determines corresponding data for an entity based on the retrieved data. To illustrate, in response to determining that a first entity has a similar entity size and entity type as a second entity, the emissions optimizer system 112 utilizes the neural network to determine missing data or estimated data associated with the first entity based on retrieved data for the second entity. In addition, the emissions optimizer system 112 can determine missing/estimated data (or modifications to the entity data) associated with the first entity by averaging corresponding data from a plurality of similar entities (e.g., a weighted average of data from the N most similar entities based on corresponding feature representations). In some instances, the emissions optimizer system 112 also compares the entity data for the first entity to similar entities and notifies the first entity in response to detecting significant deviations from similar entities (e.g., indicating a possible error in the entity data).

As illustrated in FIG. 3, the emissions optimizer system 112 also determines target emissions values 312 for modifying physical emissions sources corresponding to an entity. In one or more embodiments, the emissions optimizer system 112 determines the target emissions values 312 based on emissions goals for a future time period for the entity. For example, the emissions optimizer system 112 determines that emissions goals for reducing emissions produced by the entity by a specific amount/percentage within a specific amount of time (e.g., −20% emissions within two years). In some embodiments, the emissions optimizer system 112 thus determines the target emissions values 312 based on the emissions values 306 and the emissions goals for the entity (e.g., based on one or more percentages of the emissions values 306).

After determining the emissions values 306, the constraints 310, and the target emissions values 312 the emissions optimizer system 112 utilizes the modified gradient descent model 300 to generate the action recommendations 302. Specifically, the emissions optimizer system 112 utilizes the modified gradient descent model 300 to iteratively adjust the emissions values 306 corresponding to the physical emissions sources toward the target emissions values 312. Furthermore, the emissions optimizer system 112 utilizes the modified gradient descent model 300 to adjust the emissions values 306 while meeting the constraints 310.

As mentioned, the number of variables involved in adjusting emissions values for large numbers of physical emissions sources of different types and given various constraints can be very large. To illustrate, even small entities can be associated with tens or hundreds of physical emissions sources, while large entities can be associated with tens of thousands or hundreds of thousands of physical emissions sources. Accordingly, optimizing variables for such large numbers of variables is impractical (or even impossible) utilizing conventional manual methods (e.g., via spreadsheet tools) given current software/hardware limitations. Additionally, adjusting certain emissions values (or corresponding physical emissions sources) can affect other emissions values or violate one or more constraints during optimization, resulting in a complex emissions optimization problem. The emissions optimizer system 112 thus utilizes the modified gradient descent model 300 to generate an emissions reduction plan 314 including a plurality of emissions values modifications 314a-314n. For example, the emissions optimizer system 112 generates a first emission values modification 314a for modifying a first physical emissions source (or source category), a second emissions values modification 314b for modifying a second physical emissions source (or source category), etc. Each emissions values modification includes a plan to meet a specific number of units of a particular physical emissions source for meeting the target emissions values.

In one or more additional embodiments, the modified gradient descent model 300 also determines whether the target emissions values are possible given the emissions values 306 and the constraints 310. In particular, an entity may have established constraints and/or target emissions values that are incompatible with each other. Accordingly, the emissions optimizer system 112 utilizes the modified gradient descent model 300 to determine whether to modify one or more of the constraints 310 and/or target emissions values 312 in addition to any emissions values modifications.

Figure 4:
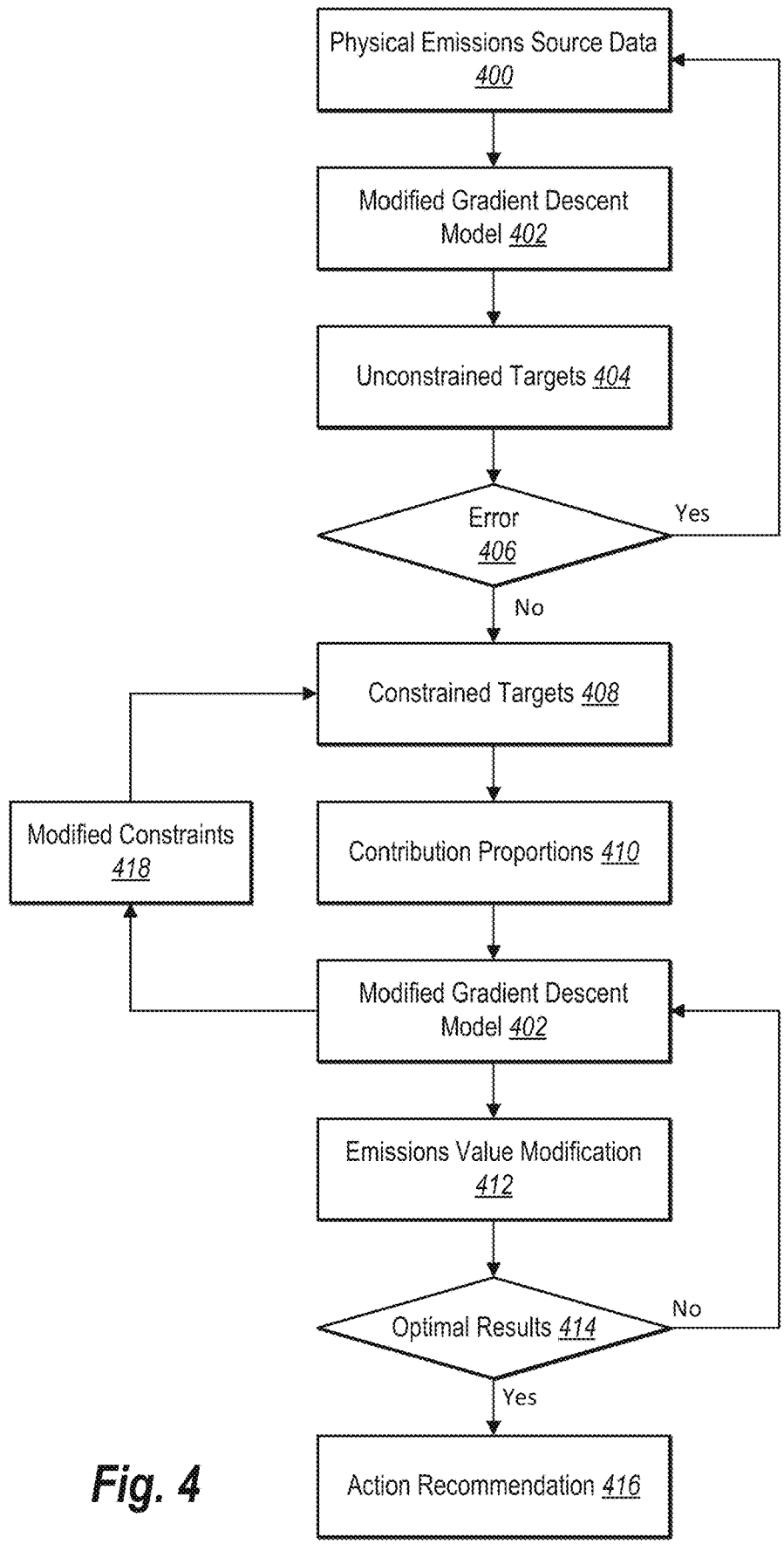
FIG. 4 illustrates an example of the emissions optimizer system utilizing a modified gradient descent model to iteratively adjust emissions values for physical emissions sources in accordance with one or more implementations.

In one or more embodiments, the emissions optimizer system 112 utilizes a modified gradient descent model including a multi-variable objective algorithm such as a mixed-integer linear programming model to iteratively adjust emissions values for a plurality of physical emissions sources. FIG. 4 illustrates a process by which a modified gradient descent model determines emissions value modifications for generating action recommendations to reduce emissions for an entity. Specifically, the emissions optimizer system 112 utilizes the modified gradient descent model to iteratively adjust emissions values for physical emissions sources according to target emissions values and one or more constraints.

As illustrated in FIG. 4, the emissions optimizer system 112 determines physical emissions source data 400 for an entity. In particular, as previously mentioned, the physical emissions source data 400 includes information indicating unit numbers and source types of physical emissions sources corresponding to the entity. For example, the physical emissions source data 400 includes data representing one or more previous time periods (e.g., one or several years of recent data for the entity). In connection with determining the physical emissions source data 400, the emissions optimizer system 112 also determines emissions values based on the physical emissions source data 400.

According to one or more embodiments, the emissions optimizer system 112 utilizes a modified gradient descent model 402 to process the physical emissions source data 400. For example, the emissions optimizer system 112 utilizes the modified gradient descent model 402 according to a set of unconstrained targets 404. Specifically, the emissions optimizer system 112 provides the modified gradient descent model 402 with no constraints to first determine whether the physical emissions source data 400 or emissions values are erroneous or whether the modified gradient descent model or other component has an error. To illustrate, the modified gradient descent model 402 iterates through the emissions values to determine if there is any combination of emissions values that meet the unconstrained targets 404. If the modified gradient descent model 402 does not output any results, the emissions optimizer system 112 determines that there is an error 406 and returns to the physical emissions source data 400 to find and correct the error with the physical emissions source data 400, the corresponding emissions values, and/or the modified gradient descent model 402.

For instance, the modified gradient descent model 402 includes an iterative optimization algorithm that determines a local minimum of a function given a number of variables. In particular, the modified gradient descent model 402 iteratively adjusts a set of initial parameter values to minimize a given cost function. In one or more embodiments, the modified gradient descent model 402 finds the local minimum of a function by performing a plurality of steps proportional to the negative of a gradient, which measures the change in weights relative to the change in error (e.g., a partial derivative with respect to a plurality of input variables). According to one or more embodiments, in response to determining that the gradient reaches a local minimum (e.g., the cost function is as small as possible), the modified gradient descent model 402 terminates. Furthermore, in one or more embodiments, the modified gradient descent model 402 determines a number of results according to the initial parameters and a learning rate. Thus, in some embodiments, the emissions optimizer system 112 modifies the speed of the modified gradient descent model 402 by adjusting the number of input parameters and/or the learning rate associated with the modified gradient descent model 402.

If the modified gradient descent model 402 outputs results, the emissions optimizer system 112 determines that the data/model are not erroneous moves to the next steps (i.e., optimizing the emissions values for the entity). As illustrated, after determining that there is no error in the physical emissions source data 400, the corresponding emissions values, and/or the modified gradient descent model 402, the emissions optimizer system 112 provides a set of constrained targets 408 to the modified gradient descent model 402. In particular, the emissions optimizer system 112 utilizes entity-provided constraints and/or estimated constraints (e.g., via a machine-learning model) to optimize the emissions values.

In one or more embodiments, the emissions optimizer system 112 determines contribution proportions 410 corresponding to the plurality of physical emissions sources to the emissions values. For instance, the emissions optimizer system 112 determines a total emissions value of emissions produced by the physical emissions sources. In additional embodiments, the emissions optimizer system 112 determines total emissions values for a plurality of emission types produced by the physical emissions sources. The emissions optimizer system 112 determines percentage weights of the physical emissions sources (e.g., a weight for each source category) relative to the total emissions value (or to the total emissions value for each emission type). Accordingly, the emissions optimizer system 112 determines how much each physical emissions source (or source category) contributes to the total emissions produced by the entity.

In one or more additional embodiments, the emissions optimizer system 112 determines contributions of the physical emissions sources to one or more additional parameters. For example, the emissions optimizer system 112 determines contribution proportions of the physical emissions sources to total costs associated with the physical emissions sources (e.g., according to predefined cost values assigned based on a source category, emissions, or other data associated with a physical emissions source). To illustrate, the emissions optimizer system 112 determines total costs associated with operations of objects and/or actions corresponding to the physical emissions sources. The emissions optimizer system 112 determines how much each of the physical emissions sources (or source categories) contributes to the total cost.

After determining the contribution proportions 410 of the physical emissions sources to the total emissions value(s) and/or to one or more additional parameters, the emissions optimizer system 112 utilizes the modified gradient descent model 402 to optimize the emissions values for the physical emissions sources based on the constrained targets 408. Specifically, the emissions optimizer system 112 utilizes the modified gradient descent model 402 to iteratively adjust emissions values for the physical emissions sources according to the contribution proportions 410. For instance, the emissions optimizer system 112 ranks/sorts the physical emissions sources according to the contribution proportions 410, such as by sorting the physical emissions sources from highest contribution proportion to lowest contribution proportion.

The emissions optimizer system 112 utilizes the modified gradient descent model 402 to adjust emissions values associated with the physical emissions sources according to the contribution proportions 410. To illustrate, the modified gradient descent model 402 selects the physical emissions source with the highest contribution proportion and adjusts an emissions value of the selected physical emissions source. For example, the modified gradient descent model 402 determines a base unit value for the selected physical emissions source indicating a current/most recent number of units of the physical emissions source. The modified gradient descent model 402 further determines a maximum number of units and a minimum number of units based on one or more constraints provided to the modified gradient descent model 402.

In one or more embodiments, the modified gradient descent model 402 utilizes a search model (e.g., a binary search model) to select an initial value corresponding to an emissions value modification 412 and step the value up or down based on the generated results. With each selected value, modified gradient descent model 402 determines whether costs associated with the value provide optimal results 414 based on one or more thresholds. To illustrate, the modified gradient descent model 402 determines whether emissions values corresponding to the selected value result in emissions values that are lower than a previous iteration. In additional embodiments, the modified gradient descent model 402 determines whether the emissions values corresponding to the selected value result in emissions values lower than a constraint (e.g., an entity-defined emissions goal). In some embodiments, the modified gradient descent model 402 can also (or alternatively) determine whether the selected value lowers the overall emissions values while being higher than one or more constraints (e.g., a minimum unit number).

If the modified gradient descent model 402 generated results and determines that the selected value meets each of the above-indicated thresholds, the emissions optimizer system 112 utilizes the modified gradient descent model 402 to iteratively determine one or more new values while performing the above process again. Specifically, the modified gradient descent model 402 utilizes the search model to iteratively select new values (e.g., by stepping up or down) and determine whether the new value meet the threshold(s). Once the modified gradient descent model 402 determines that a selected value provides results that do not meet one or more of the above-indicated thresholds, the emissions optimizer system 112 may determine that the selected value corresponds to optimal results 414 for the emissions value modification 412.

As illustrated in FIG. 4, the emissions optimizer system 112 generates an action recommendation 416 for providing to the entity to perform the emissions value modification 412. For example, the emissions optimizer system 112 generates the action recommendation 416 including an indication to modify a number of units of a corresponding physical emissions source. In some embodiments (e.g., as described with respect to FIG. 5), the emissions optimizer system 112 utilizes the emissions values to generate the action recommendation 416 in a user-friendly format.

In one or more embodiments, the emissions optimizer system 112 utilizes the modified gradient descent model 402 to continue optimizing the plurality of physical emissions sources until meeting the constrained targets 408. In particular, the emissions optimizer system 112 determines, after optimizing a particular physical emissions source, whether the optimized emissions values meet the constrained targets 408. If not, the emissions optimizer system 112 utilizes the modified gradient descent model 402 to select another physical emissions source (e.g., the next highest contributing physical emissions source) and optimize the newly selected physical emissions source. The emissions optimizer system 112 continues optimizing the physical emissions sources and generating action recommendations for emissions value modifications until meeting the constrained targets 408.

In some embodiments, if the emissions optimizer system 112 iterates through all physical emissions sources and does not meet the constrained targets 408, the emissions optimizer system 112 determines that the constraints and/or the target emissions values are unrealistic (i.e., not possible given the physical emissions sources). Accordingly, in one or more embodiments, the emissions optimizer system 112 utilizes the modified gradient descent model 402 to adjust the emissions values of the physical emissions sources with only the constraints (e.g., with no user-defined target emissions values). If the modified gradient descent model 402 generates valid results, the emissions optimizer system 112 repeats the optimization process for the physical emissions sources to optimize the emissions values as much as possible toward a set of model-defined target emissions values (e.g., default target emissions values).

If the modified gradient descent model 402 does not generate valid results, the emissions optimizer system 112 determines that one or more of the constraints are not possible. According to one or more embodiments, the emissions optimizer system 112 relaxes one or more constraints to determine modified constraints 418 (e.g., by incrementally reducing or increasing specific constraint values) and utilizes the modified gradient descent model 402 to optimize the results, if possible. The emissions optimizer system 112 provides one or more action recommendations in connection with the modified constraints 418. For instance, the emissions optimizer system 112 generates one or more action recommendations to modify one or more physical emissions sources and one or more action recommendations based on the modified constraints 418 for use in determining the constrained targets 408. Furthermore, if the emissions optimizer system 112 determines that the modified gradient descent model 402 is unable to produce valid results with the modified constraints 418, the emissions optimizer system 112 modifies the target emissions values and repeats the process until determining target emissions values that produce valid results.

Figure 5:
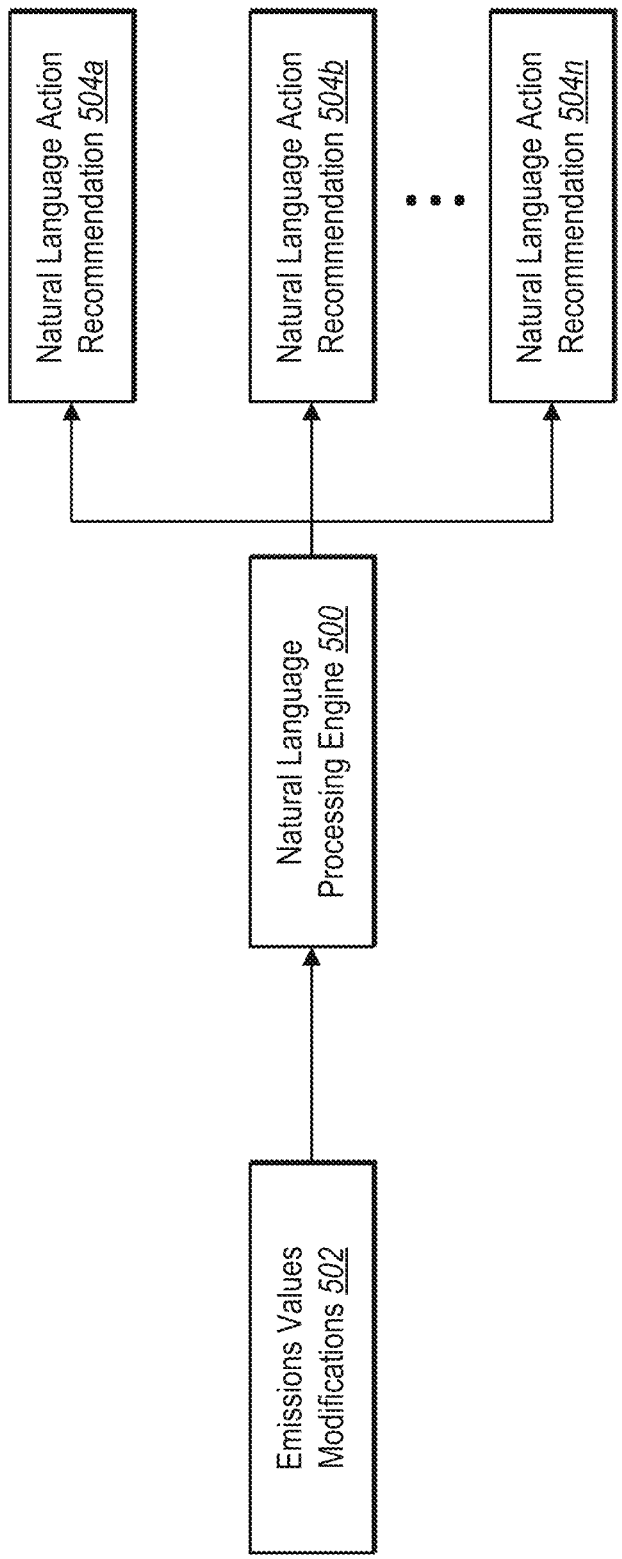
FIG. 5 illustrates an example of the emissions optimizer system utilizing generating natural language action recommendations for modifying emissions values in accordance with one or more implementations.

As mentioned, in one or more embodiments, the emissions optimizer system 112 generates action recommendations in a user-friendly format. FIG. 5 illustrates a diagram of the emissions optimizer system 112 generating natural language recommendations. In particular, the emissions optimizer system 112 utilizes a natural language processing engine 500 to convert or transform emissions values modifications 502 to a plurality of natural language action recommendations 504a-504n. More specifically, the emissions optimizer system 112 utilizes the natural language processing engine 500 to convert data associated with the emissions values modifications 502 into the natural language action recommendations 504a-504n.

In one or more embodiments, the emissions optimizer system 112 utilizes the natural language processing engine 500 to process the emissions values modifications 502. For example, the emissions optimizer system 112 determines physical emissions source data and an emissions values modification for a physical emissions source. The emissions optimizer system 112 utilizes the natural language processing engine 500 to generate one or more natural language phrases or sentences that describe the physical emissions source data and the emissions values modification.

In one or more embodiments, the natural language processing engine 500 includes a neural network that converts structured data into natural language phrases. To illustrate, the natural language processing engine 500 includes a language-based neural network such as a generative transformer-based neural network or a long short-term memory neural network to extract relationships between data points and convert the extracted relationships into natural language phrases referencing the data points. The natural language processing engine 500 converts the physical emissions source data and emissions value modifications to generate natural language phrases indicating one or more actions to achieve a desired result.

For example, the natural language processing engine 500 determines relationships between values in physical emissions source data. In one or more embodiments, the natural language processing engine 500 also determines relationships between initial physical emissions source data and modified physical emissions source data (e.g., based on differences between initial emissions values and modified emissions values). The natural language processing engine 500 converts the relationships to natural language phrases by generating sentences or phrases indicating the relationships or differences.

As discussed above, in one or more embodiments, the emissions optimizer system 112 utilizes a deep-learning based natural language processing model (e.g., an NLP model) to determine intent classifications associated with instances of natural language input. For instance, the emissions optimizer system 112 utilizes a natural language processing engine 500 or NLP model including an encoder layer and a decoder layer.

As mentioned above, the encoder layer receives a structured data input (e.g., the emissions values modifications) and parses the input into words, characters, or character n-grams. In one or more embodiments, the emissions optimizer system 112 embeds the words, characters, or character n-grams into one or more input vectors. For example, the emissions optimizer system 112 can encode the input utilizing one-hot encoding, or a neural embedding based on word semantics.

In one or more embodiments, the emissions optimizer system 112 feeds the generated input vector for each word in the input to the encoder layer including bi-directional LSTM layers. The bi-directional LSTM layers of the encoder layer can each include a first layers and second layers. In at least one embodiment, the first and second layers include series of LSTM units that are organized bi-directionally. In one or more embodiments, the bi-directional organization divides the LSTM units into two directions. For example, half of the LSTM units are organized 'forward,' or in a sequence over increasing sequence instances, while the other half of the LSTM units are organized 'backward,' or in a sequence over decreasing sequence instances. By organizing the LSTM units in opposite directions, the encoder layer can simultaneously utilize content information from the past and future of the current sequence instance to inform the output of the encoder layer.

Generally, each LSTM unit includes a cell, an input gate, an output gate, and a forget gate. As such, each LSTM unit can "remember" values over arbitrary time intervals while regulating the flow of information into and out of the unit. Thus, for example, a first LSTM unit in the first layer of the encoder layer can analyze an input vector encoding the a first input token. A second LSTM unit in the first layer can analyze an input vector encoding a second input token as well as a feature vector from the first LSTM unit (e.g., a latent feature vector encoding significant features of the first input or other previous inputs in the sequence).

The natural language processing engine 500 sequentially models the input, where latent feature vectors of previous layers (corresponding to previous text inputs and training text inputs) are passed to subsequent layers, and where hidden states of text inputs are obtained to generate vectors for each word embedded into the input vector. Each of the layers of the encoder layer further determine relationships between words embedded into the input vector and other contextual information to generate output vectors.

For example, the encoder layer can output a sequence vector that feeds directly into the decoder layer. The decoder layer is configured similarly to the encoder layer with multiple bi-directional LSTM layers. In response to receiving the sequence vector from the encoder layer, the layers of the decoder layer can output a predicted phrase or sentence indicating one or more actions to achieve a desired result based on the physical emissions source data and emissions value modifications.

To illustrate, the emissions optimizer system 112 determines that the physical emissions source data indicates a number of units and/or emissions values for a physical emissions source or an emission type for a previous year and an emissions values modification that indicates a new number of units and/or emissions values for a future time period. The emissions optimizer system 112 utilizes the natural language processing engine 500 to generate a sentence indicating the change in values from the previous time period to the future time period. As an example, the resulting natural language recommendation includes "Reduce natural gas from 15 K in the base year (2020) to 13 K in the target year (2022)." In an additional example, the emissions optimizer system 112 also provides natural language action recommendations in connection with specific business actions such as "Increase electric vehicles from 14 in the base year (2020) to 18 in the target year (2022)." In additional embodiments, the emissions optimizer system 112 also generates natural language recommendations including budgetary implications of emissions values modifications.

In one or more embodiments, the emissions optimizer system 112 utilizes user inputs to further train the natural language processing engine 500. To illustrate, the emissions optimizer system 112 utilizes a selected natural language action recommendation to further train the natural language processing engine 500 for future recommendations (e.g., as a positive example to steer the natural language processing engine 500 to produce similar recommendations/styles in the future). Additionally, the emissions optimizer system 112 utilizes the unselected recommendations as negative examples for training the natural language processing engine 500.

Figure 6A:
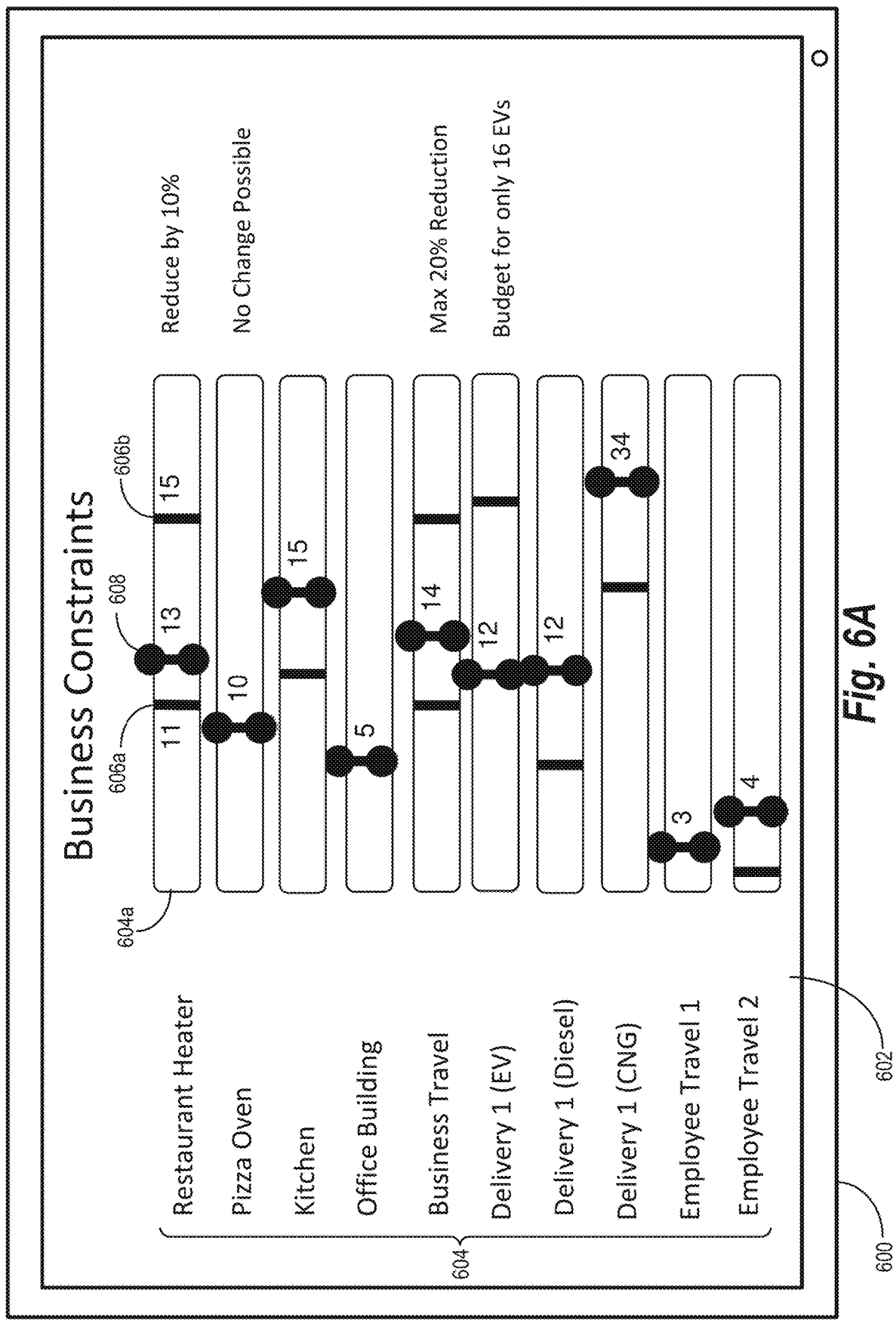
FIGS. 6A-6B illustrate examples of graphical user interfaces including graphical user interface elements for setting a plurality of constraints and a plurality of target emissions values in accordance with one or more implementations.
Figure 6B:
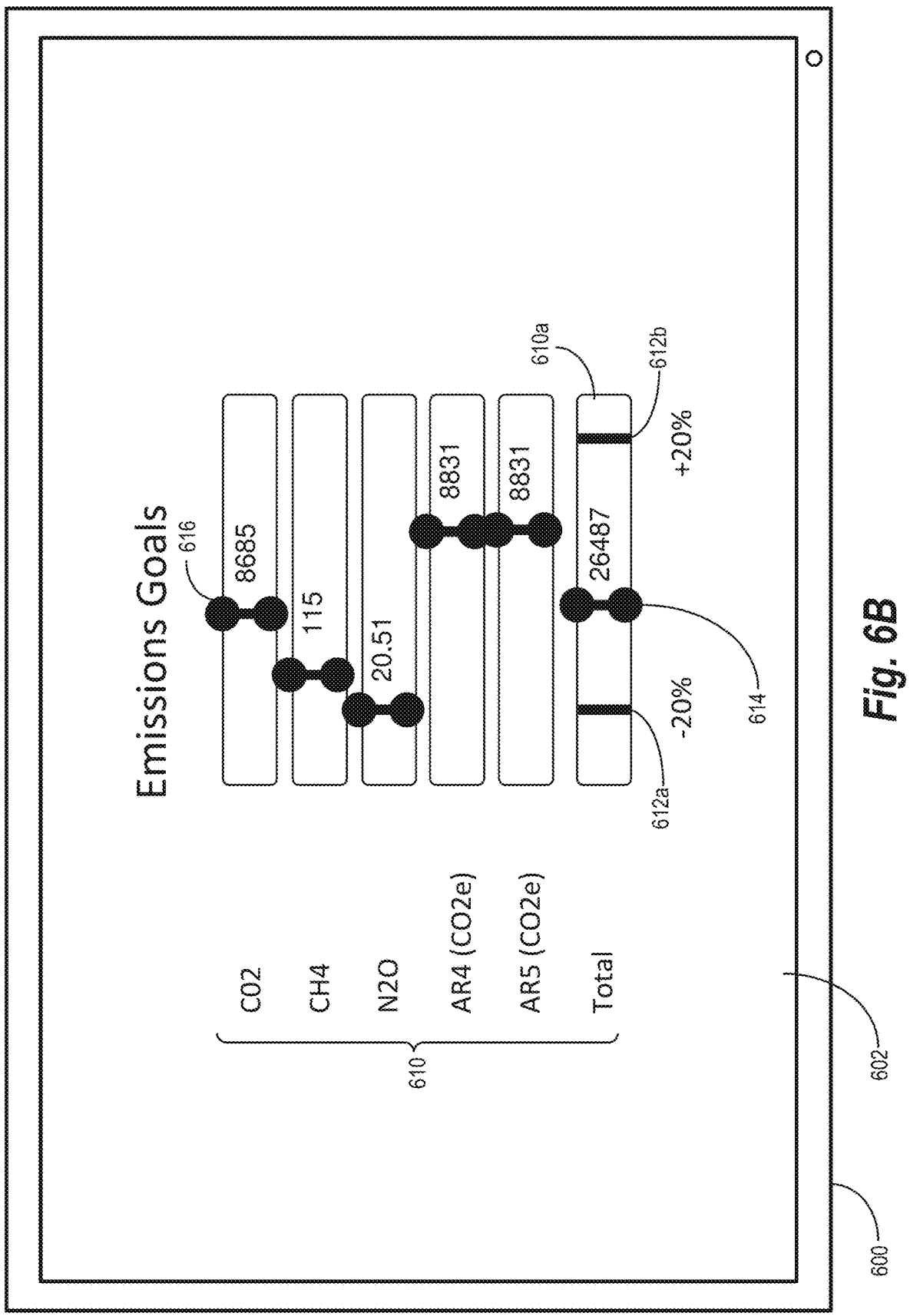

As previously described, in one or more embodiments, the emissions optimizer system 112 determines constraints for determining emissions values modifications. For example, the emissions optimizer system 112 receives user-defined constraints and/or target emissions values for an entity. FIGS. 6A-6B illustrate graphical user interfaces for setting constraints and target emissions values. Specifically, FIG. 6A illustrates a graphical user interface for setting a plurality of constraints for a plurality of physical emissions sources. FIG. 6B illustrates a graphical user interface for setting one or more target emissions values for specific emission types.

FIG. 6A illustrates a client device 600 presenting a graphical user interface of a client application 602 for various entity management operations. Specifically, the client device 600 displays a plurality of graphical user interface elements 604 corresponding to a plurality of different physical emissions sources. For instance, the client device 600 displays a graphical user interface element 604a corresponding to a first physical emissions source (e.g., a "Restaurant Heater") for an entity. In connection with the graphical user interface element 604a, the client device 600 receives user input to define one or more constraints for the first physical emissions source.

To illustrate, the client device 600 displays a minimum constraint 606a indicating a minimum number of units, minimum costs, or other minimum value associated with the first physical emissions source. The client device 600 also displays a maximum constraint 606b indicating a maximum number of units, maximum costs, or other maximum value associated with the first physical emissions source. Accordingly, the emissions optimizer system 112 determines various constraints associated with the physical emissions sources based on user inputs via the client device 600.

As illustrated in FIG. 6A, in one or more embodiments, the client device 600 also displays results generated by the emissions optimizer system 112. In particular, the emissions optimizer system 112 utilizes a modified gradient descent model to generate a plurality of emissions values modifications based on the provided constraints. For instance, the emissions optimizer system 112 generates an emissions value modification for the first physical emissions source based on the minimum constraint 606a and the maximum constraint 606b. The emissions optimizer system 112 provides the emissions value modification to the client device 600, which displays a modification element 608 indicating the emissions value modification. As shown, the emissions optimizer system 112 generated the emissions value modification to include a value between the minimum constraint 606a and the maximum constraint 606b, which provides an easily verifiable, user friendly format for viewing modifications to perform relative to the physical emissions sources.

FIG. 6B illustrates the client device 600 presenting an additional graphical user interface of the client application 602. In particular, the client device 600 displays a plurality of graphical user interface elements 610 corresponding to a plurality of different emission types. For instance, the client device 600 displays a graphical user interface element 610a corresponding to a total emissions representing a combination of all emission produced by physical emissions sources for the entity. In connection with the graphical user interface element 610a, the client device 600 receives user input to define one or more constraints for the total emissions.

To illustrate, the client device 600 displays a minimum constraint 612a indicating a minimum total emissions value for emissions produced by physical emissions sources for the entity. The client device 600 also displays a maximum constraint 612b indicating a maximum total emissions value for emissions produced by physical emissions sources for the entity. In some embodiments, the client device 600 also receives user inputs for setting one or more constraints associated with one or more of the different emission types (minimum/maximum emissions values for a first emission type, minimum/maximum emissions values a second emission type, etc.) The emissions optimizer system 112 thus determines various constraints associated with the emissions produced by the physical emissions sources for the entity based on one or more user inputs via the client device 600.

As illustrated in FIG. 6B, in some embodiments, the client device 600 also displays results generated by the emissions optimizer system 112. In particular, the emissions optimizer system 112 utilizes a modified gradient descent model to generate a target total emissions value. For instance, the emissions optimizer system 112 utilizes the modified gradient descent model to iteratively adjust emissions values for a plurality of physical emissions sources to determine one or more emissions values modifications based on provided constraints (e.g., based on constraints for the physical emissions sources and the emissions values). The emissions optimizer system 112 provides a resulting total emissions value to the client device 600, which displays a total emissions element 614 indicating the resulting total emissions based on one or more emissions value modifications. Additionally, in one or more embodiments, the client device 600 displays emission type elements (e.g., a first emission type element 616) indicating results generated for individual emission types in connection with the resulting total emissions value.

In one or more additional embodiments, the emissions optimizer system 112 provides additional methods for users to indicate constraints and/or target emissions values. For instance, rather than the graphical user interface elements of FIGS. 6A-6B, the emissions optimizer system 112 can provide slider elements, text fields, or other graphical user interface elements. In additional embodiments, the emissions optimizer system 112 utilizes one or more machine-learning models to determine one or more constraints for an entity. Furthermore, after determining one or more predicted constraints utilizing machine-learning models, the emissions optimizer system 112 can also provide the predicted constraints to a client device for confirmation and/or adjustment by a user associated with the entity.

Figure 7:
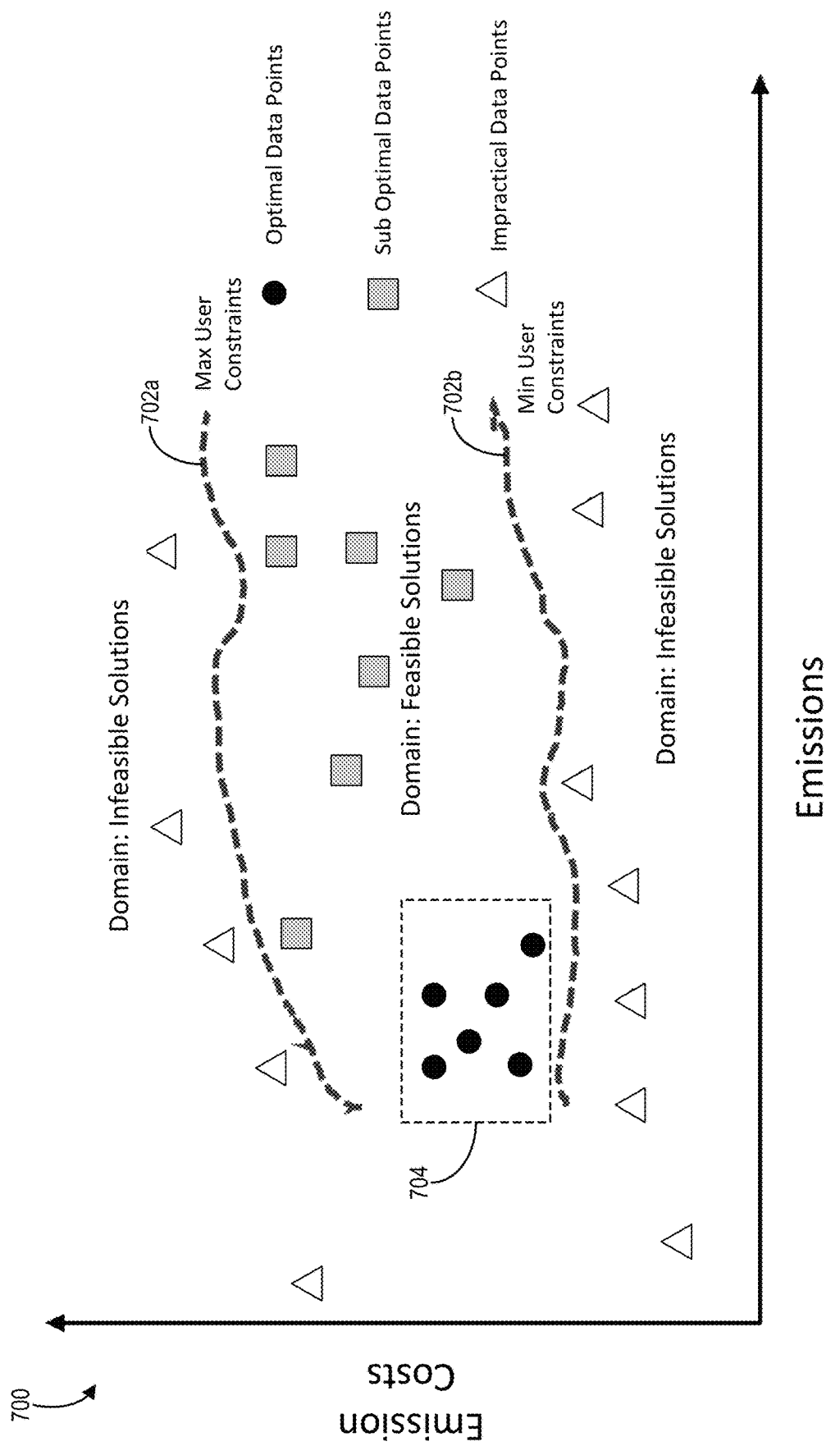
FIG. 7 illustrates examples of sampled data points generated by the emissions optimizer system utilizing a modified gradient descent model in accordance with one or more implementations.

FIG. 7 illustrates a graph diagram 700 of a plurality of results generated via a plurality of iterations of a modified gradient descent model in connection with a plurality of physical emissions sources, a plurality of constraints, and one or more target emissions values. In one or more embodiments, as mentioned, the emissions optimizer system 112 utilizes the modified gradient descent model to iteratively adjust emissions values for a plurality of physical emissions sources according to the constraints and the target emissions value(s). Specifically, the graph diagram 700 represents solutions generated by the modified gradient descent model of emissions (e.g., emissions values) for a plurality of physical emissions sources relative to source costs (e.g., according to predefined emission cost per unit of physical emissions source).

For example, as illustrated in FIG. 7, the emissions optimizer system 112 determines maximum user constraints 702a and minimum user constraints 702b indicating maximum and minimum values, respectively, of source costs. After determining the constraints, the emissions optimizer system 112 utilizes the modified gradient descent model to iteratively adjust emissions values of a plurality of physical emissions sources toward one or more target emissions values. As the modified gradient descent model adjusts the emissions values, the emissions optimizer system 112 also determines whether the resulting emission values meet the maximum user constraints 702a and the minimum user constraints 702b.

To illustrate, the emissions optimizer system 112 determines that results above the maximum user constraints 702a or below the minimum user constraints 702b are infeasible solutions. Furthermore, the emissions optimizer system 112 determines that results that meet the maximum user constraints 702a and the minimum user constraints 702b are feasible solutions. The emissions optimizer system 112 utilizes the modified gradient descent model to iteratively adjusts the emissions values until determining one or more optimal results. Specifically, as illustrated in FIG. 7, the emissions optimizer system 112 determines feasible solutions that meet the constraints but do not meet one or more target emissions values. Accordingly, the emissions optimizer system 112 continues adjusting emissions values to determine optimal results 704 including feasible solutions that meet the constraints and also meet the one or more target emissions values.

As illustrated in FIG. 7, the emissions optimizer system 112 is able to quickly and efficiently determine feasible solutions that meet a set of constraints and target emissions values by adjusting emissions values for individual physical emissions sources in an iterative process. As shown, the solution space can include a very large number of possible solutions (e.g., hundreds or thousands or more) depending on the number of physical emissions sources and constraints. By utilizing the modified gradient descent model with an efficient search model, the emissions optimizer system 112 reduces the number of solutions generated to a small fraction of the total possible solutions. Accordingly, the emissions optimizer system 112 significantly improves the efficiency of a computing device by reducing the computing resources required to generate results that reduce emissions for a plurality of physical emissions sources of the entity.

According to one or more embodiments, the emissions optimizer system 112 determines a plurality of results that meet constraints and also meet target emissions values. For example, the emissions optimizer system 112 determines a plurality of different combinations of emissions value modifications for a plurality of physical emissions sources that each meets the constraints and target emissions values. To illustrate, the emissions optimizer system 112 utilizes the modified gradient descent model to generate a plurality of different results by processing the physical emissions sources according to different criteria (e.g., based on contribution proportions relative to emissions values, contribution proportions relative to source costs, or other sorting methods). The emissions optimizer system 112 provides action recommendations for each result in the optimal results 704.

FIGS. 8A-8F illustrate chart diagrams of an example in which the emissions optimizer system 112 utilizes a modified gradient descent model to generate emissions value modifications for a plurality of physical emissions sources. For example, FIG. 8A illustrates a chart diagram 800 including a plurality of physical emissions sources corresponding to an entity. In one or more embodiments, the physical emissions sources correspond to specific source categories (e.g., "fuel type," "mobile combustion," "transport"). Additionally, the chart diagram 800 includes entity usage including heaters, ovens, buildings, travel, etc., along with the emissions sources such as gas, electricity, fuel, etc. Furthermore, as illustrated in FIG. 8A, the emissions optimizer system 112 determines unit costs, unit sizes, and unit (e.g., "mmBTU," "gal," "vehicle-mile") for each physical emissions source.

In one or more embodiments, as illustrated in FIG. 8A, the emissions optimizer system 112 also determines physical emissions source data for one or more previous time periods. Specifically, the emissions optimizer system 112 determines a number of units for each emissions source for a previous time period (e.g., the most recent year) corresponding to the entity. For example, the emissions optimizer system 112 accesses a database or repository including information about the number of units of the plurality of physical emissions sources for the entity. The physical emissions source data allows the emissions optimizer system 112 to determine emissions, costs, etc., resulting from the plurality of physical emissions sources for the entity.

To illustrate, FIG. 8B illustrates a chart diagram 802 of a plurality of emission types produced by the physical emissions sources for the entity. For instance, the emissions optimizer system 112 accesses a database including emissions data to determine emissions values of a plurality of emission types produced by each physical emissions source. To illustrate, the database includes the amount of emissions generated by a single unit of each physical emissions source. As shown in FIG. 8B, each unit of physical emissions source produces different emission types based on the source category of the physical emissions source. In some embodiments, the emissions optimizer system 112 determines specific emission types based on the entity, such as based on a region of the entity, a size of the entity, or other attributes of the entity, according to local regulations and/or goals of the entity.

FIG. 8C illustrates a chart diagram 804 including constraints for a modified gradient descent model and results generated by the modified gradient descent model based on the constraints and further based on the physical emissions sources of FIG. 8A. In one or more embodiments, the emissions optimizer system 112 determines minimum and maximum source values (e.g., numbers of units of corresponding physical emissions sources). The emissions optimizer system 112 utilizes the modified gradient descent model to generate emissions value modifications by iteratively adjusting the emissions values for the physical emissions sources (e.g., by adjusting the number of units for the physical emissions sources up or down). The chart diagram 804 includes the results from the modified gradient descent model ("Optimizer Output") indicating that the modified gradient descent model produced results within the provided constraints.

FIG. 8D illustrates a chart diagram 806 including comparisons of emissions values and source costs between the base year (2020) and the results of the modified gradient descent model for the entity for a future time period (e.g., 2022). Specifically, the chart diagram 806 includes source costs of the base year according to the number of units of the plurality of physical emissions sources and the source costs associated with the physical emissions sources. In addition, the chart diagram 806 includes the contribution proportions of the physical emissions sources as percentages of the total source costs and the total emissions values for the base year and the modified gradient descent model results. As illustrated, the emission source "CNG—Light-duty vehicles" includes the highest contribution to the total source costs, while the emissions source "Blast Furnace Gas" corresponding to the restaurant heater produces the highest contribution to the total emissions. Furthermore, as illustrated in the chart diagram 806, the results of the modified gradient descent model include higher source costs relative to the source costs of the base year.

While the modified gradient descent model generated results with higher costs for the future time period, the chart diagram 806 also indicates that the modified gradient descent model produced results that reduce emissions for the future time period. Specifically, as illustrated in FIG. 8D, the emissions optimizer system 112 utilizes the modified gradient descent model to adjust emissions values for some of the physical emissions sources relative to the base year. For example, the emissions optimizer system 112 generates emissions value modifications that result in a decrease of total emissions values from 28,133.14 to 26,534.17—a total decrease of 5.6%.

FIG. 8E illustrates a chart diagram 808 including the total emissions values for the plurality of physical emissions sources based on the number of units of each physical emissions source for the base year. Additionally, the chart diagram 808 includes the total emissions values of each emission type contributing to the total emissions values. FIG. 8F illustrates a chart diagram 810 including the total emissions values for the plurality of physical emissions sources based on the number of units of each physical emissions source for the future time period (e.g., results generated by the modified gradient descent model). The chart diagram 810 includes the total emissions values of each emission type contributing to the total emissions values. As shown in FIGS. 8E-8F, the emissions optimizer system 112 provides improved emissions reductions across the plurality of emission types by adjusting emissions values for the plurality of physical emissions sources in accordance with the constraints and one or more target emissions values.

Figure 9:
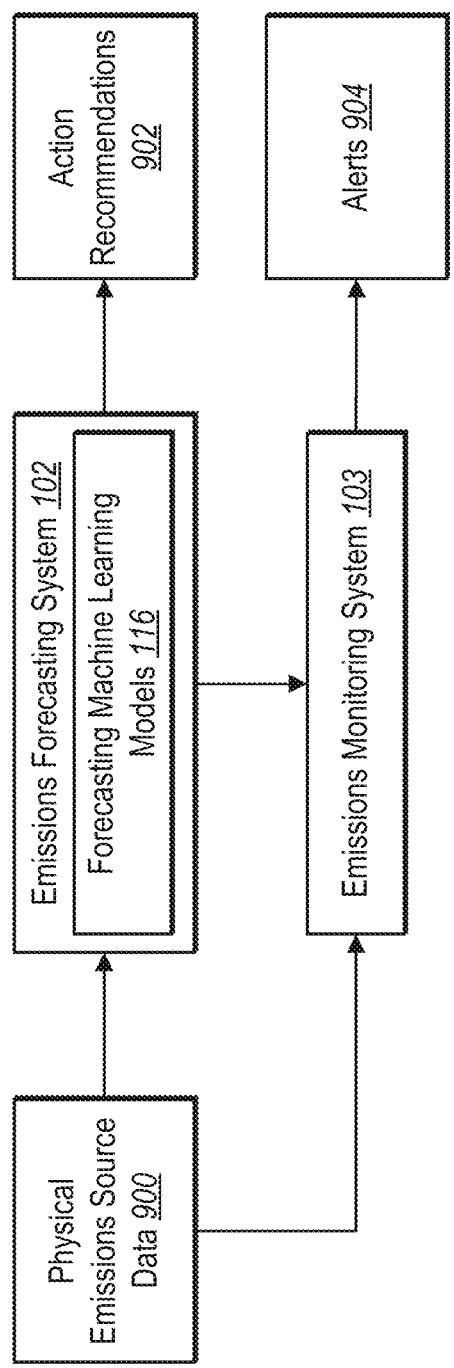
FIG. 9 illustrates an example of an overview of a process of the emissions forecasting system utilizing a plurality of forecasting machine-learning models to generate action recommendations for modifying physical emissions sources with one or more implementations.

As mentioned, the emissions forecasting system 102 utilizes a plurality of forecasting machine-learning models to forecast emissions data for a plurality of physical emissions sources for a future time period. FIG. 9 illustrates an overview of the emissions forecasting system 102 processing physical emissions source data 900 of physical emissions sources to generate action recommendations 902. In particular, the emissions forecasting system 102 utilizes the plurality of forecasting machine-learning models 116 to generate forecasted emissions value modifications for the physical emissions sources for one or more future time periods (e.g., an upcoming year or years). The emissions forecasting system 102 generates the action recommendations 902 based on the forecasted emissions value modifications. Additionally, FIG. 9 illustrates the emissions monitoring system 103 providing alerts 904 based on deviations of emissions data during the one or more future time periods from forecasted data.

According to one or more embodiments, the emissions forecasting system 102 determines the physical emissions source data 900 in connection with a plurality of physical emissions sources for an entity. To illustrate, as previously described, the emissions forecasting system 102 determines a number and a type of each of a plurality of physical emissions sources corresponding to the entity. In additional embodiments, the physical emissions source data 900 includes additional source attributes corresponding to the physical emissions sources such as, but not limited to, emissions costs or other costs, source categories, emission types, or other attributes of the physical emissions sources.

In one or more embodiments, the emissions forecasting system 102 determines the forecasting machine-learning models 116 for the physical emissions sources based on attributes of the physical emissions sources. For instance, a machine-learning model of the forecasting machine-learning models 116 include a computer representation that is tuned (e.g., trained) based on inputs to approximate unknown functions. For instance, a machine-learning model includes a neural network with one or more layers or artificial neurons that approximate unknown functions by analyzing known data at different levels of abstraction. In some embodiments, a machine-learning model includes one or more neural network layers including, but not limited to, a deep learning model, a convolutional neural network, a recurrent neural network, a fully-connected neural network, or a combination of a plurality of neural networks and/or neural network types. In additional embodiments, a machine-learning model includes, but is not limited to, an autoregressive moving average model, a seasonal autoregressive integrated moving average model, an ensemble learning model, a linear regression model, or a weighted model. Accordingly, in come embodiments, the forecasting machine-learning models 116 include a variety of different machine-learning models based on the corresponding physical emissions sources.

According to one or more embodiments, the emissions forecasting system 102 utilizes the forecasting machine-learning models 116 to generate the action recommendations 902 based on the physical emissions source data 900. Specifically, the emissions forecasting system 102 utilizes the forecasting machine-learning models 116 to generate forecasted source attributes for the physical emissions sources for a future time period. The emissions forecasting system 102 utilizes the forecasted source attributes to determine forecasted emissions value modifications for the future time period. Furthermore, the emissions forecasting system 102 generates the action recommendations 902 based on the forecasted emissions value modifications. For example, as described in more detail below with respect to FIGS. 10 and FIGS. 11A-11C, the emissions forecasting system 102 generates the action recommendations 902 based on forecasted emissions data.

Additionally, the emissions monitoring system 103 monitors the physical emissions source data 900 in connection with the forecasted data generated by the emissions forecasting system 102 to determine the entity's performance relative to a generated emissions plan for a future time period. In particular, as described in more detail below with respect to FIGS. 10 and 11C, the emissions monitoring system 103 detects deviations from a forecasted emissions plan based on an entity's emissions usage during a future time period. The emissions monitoring system 103 also generates alerts 904 to provide to the entity for correcting the deviation according to the emissions plan.

Figure 10:
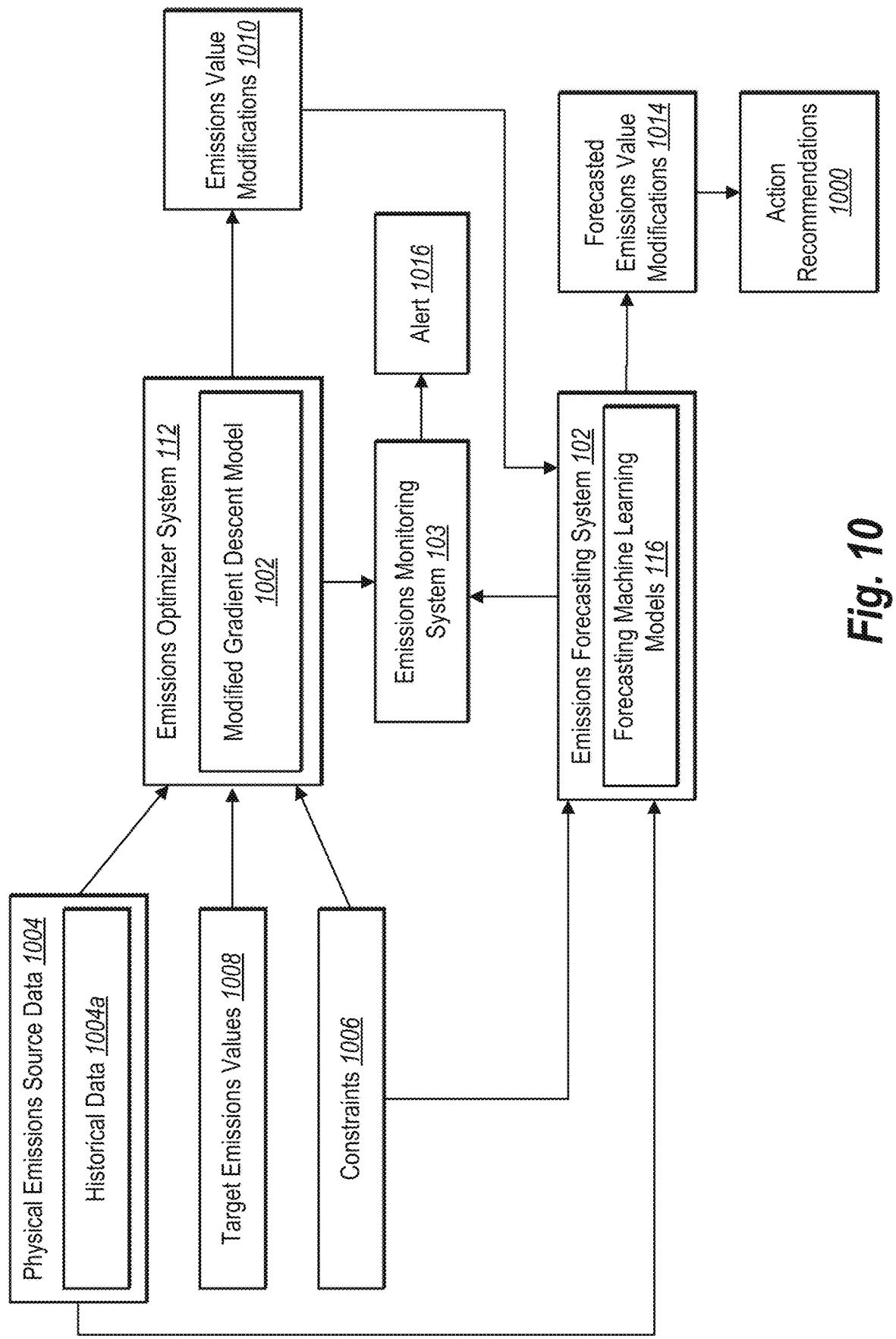
FIG. 10 illustrates an example of a detailed process of the emissions forecasting system utilizing a plurality of forecasting machine-learning models to generate action recommendations for modifying physical emissions sources in accordance with one or more implementations.

FIG. 10 illustrates a diagram of a detailed process of the emissions forecasting system 102 generating action recommendations 1000 for modifying physical emissions sources corresponding to an entity based on a plurality of forecasted source attributes. In particular, the emissions forecasting system 102 utilizes a plurality of forecasting machine-learning models 116 to generate forecasted emissions data for a future time period. The emissions forecasting system 102 utilizes the forecasted emissions data to generate the action recommendations 1000. In some embodiments, as illustrated in FIG. 10, the emissions forecasting system 102 utilizes optimized emissions data generated by the emissions optimizer system 112 for the entity to generate the forecasted emissions data. In alternative embodiments, the emissions forecasting system 102 utilizes entity data (e.g., constraints, goals, or other information associated with the entity) without optimized emissions data to generate the forecasted emissions data.

As illustrated in FIG. 10, in one or more embodiments, the emissions optimizer system 112 utilizes a modified gradient descent model 1002 to generate optimized emissions data for an entity according to data associated with the entity—including goals and limitations or constraints for the entity. To illustrate, the emissions optimizer system 112 utilizes the modified gradient descent model 1002 to process physical emissions source data 1004 according to constraints 1006 and a set of target emissions values 1008. The emissions optimizer system 112 utilizes the provided data to determine emissions value modifications 1010 for modifying the physical emissions sources corresponding to the entity. By processing the physical emissions source data 1004 according to constraints 1006 and a set of target emissions values 1008 (e.g., via the modified gradient descent model 1002), the emissions optimizer system 112 generates an initial set of action recommendations according to the goals/limitations of the entity.

According to one or more embodiments, the emissions optimizer system 112 determines historical data 1004a associated with the physical emissions source of the entity including attributes that determine an impact of a plurality of physical emissions sources on one or more defined goals for the entity such as those described with respect to FIG. 3 above. To illustrate, the historical data 1004a includes, but is not limited to, a number of units of each physical emissions source, source categories of the physical emissions sources, emissions values for the plurality of physical emissions sources based on an emissions protocol, monetary (or other) costs associated with the plurality of physical emissions sources, or types of emissions produced by physical emissions sources. In some embodiments, the historical data 1004a also includes data for individual physical emissions sources, such that the emissions forecasting system 102 is able to determine the attributes of each separate physical emissions source.

In one or more embodiments, the emissions optimizer system 112 determines constraints 1006 in connection with determining whether to modify physical emissions sources. For example, as previously indicated, the constraints 1006 include indications of requirements or limitations such as source constraints, budget constraints, or additional constraints. In at least some embodiments, the constraints 1006 include budget constraints for individual physical emissions sources or source categories or for overall financial expenditures related to the physical emissions sources. In some embodiments, the constraints 1006 include an indication of a growth level (e.g., moderate or aggressive growth including increases in parameters for various physical emissions sources) for the entity, one or more physical emissions sources, or the forecasted values.

According to one or more embodiments, the emissions optimizer system 112 determines target emissions values 1008 for the entity. For instance, the emissions optimizer system 112 determines a target emissions value for total emissions produced in connection with the physical emissions sources for optimizing the physical emissions sources and emissions output for the entity. In additional embodiments, the emissions optimizer system 112 determines target emissions values for individual physical emissions sources or source categories. Thus, the emissions optimizer system 112 determines the target emissions values 1008 in connection with an emissions goal for the entity.

After determining the physical emissions source data 1004, the constraints 1006, and the target emissions values 1008, the emissions optimizer system 112 generates emissions value modifications 1010. In particular, the emissions optimizer system 112 utilizes the modified gradient descent model 1002 to generate the emissions value modifications 1010. For example, as previously described, the emissions optimizer system 112 utilizes the modified gradient descent model 1002 to iteratively adjust emissions values associated with the physical emissions sources to determine how to modify the physical emissions sources (e.g., by modifying the corresponding emissions values) to achieve the target emissions values 1008 given the constraints 1006 and physical emissions source data 1004.

In one or more embodiments, in connection with the emissions optimizer system 112 utilizing the modified gradient descent model 1002 to evaluate the physical emissions source data 1004 based on the constraints 1006 and target emissions values 1008 for an entity, the emissions forecasting system 102 generates forecasted data for one or more future time periods for the entity. Specifically, as illustrated in FIG. 10, the emissions forecasting system 102 utilizes the physical emissions source data 1004 (e.g., the historical data 1004a) and the constraints 1006 to generate forecasted emissions value modifications 1014. More specifically, the emissions forecasting system 102 utilizes the forecasting machine-learning models 116 to generate the forecasted emissions value modifications 1014 indicating forecasted emissions production for a plurality of physical emissions sources based on the historical data 1004a associated with the physical emissions sources and the constraints 1006 for the entity.

In one or more embodiments, the emissions forecasting system 102 utilizes the forecasting machine-learning models 116 to generate various forecasted source attributes for the plurality of physical emissions sources. For instance, the emissions forecasting system 102 utilizes the forecasting machine-learning models 116 to forecast specific attributes of each physical emissions source for the entity based on the historical source attributes and constraints/goals for the entity. In some embodiments, the forecasted source attributes include, but are not limited to, unit numbers and per-unit costs for the physical emissions sources. Accordingly, the emissions forecasting system 102 generates predictions of the unit numbers and per-unit costs for the physical emissions sources for one or more future time periods. The emissions forecasting system 102 generates the forecasted emissions value modifications 1014 based on the forecasted source attributes.

As shown in FIG. 10, in some embodiments, the emissions forecasting system 102 also generates the forecasted emissions value modifications 1014 based on optimized results generated by the emissions optimizer system 112. In particular, the emissions forecasting system 102 utilizes the emissions value modifications 1010 generated utilizing the modified gradient descent model 1002 in connection with the forecasting machine-learning models 116 (e.g., under an assumption that the entity will use the emissions optimizer system 112 to optimize an emissions plan). Accordingly, the emissions forecasting system 102 generates the forecasted emissions value modifications 1014 based on the emissions value modifications 1010, the physical emissions source data 1004, and the constraints 1006. In alternative embodiments, the emissions forecasting system 102 generates the forecasted emissions value modifications 1014 based on the physical emissions source data 1004 and constraints 1006 without initial optimization via the emissions optimizer system 112.

In one or more embodiments, the emissions forecasting system 102 generates the action recommendations 1000 based on the forecasted emissions value modifications 1014. Specifically, the emissions forecasting system 102 generates the action recommendations 1000 to perform one or more actions in relation to the physical emissions sources for one or more future time periods. To illustrate, the emissions forecasting system 102 generates an action recommendation to perform one or more actions including, but not limited to, modifying physical emissions sources, modifying one or more constraints, or modifying one or more target emissions values or goals for a future time period. The emissions forecasting system 102 can also provide a plurality of action recommendations for a plurality of different future time periods or combinations of future time periods related to forecasted emissions data according to different predicted source attributes for the physical emissions sources corresponding to the entity. Thus, the action recommendations 1000 provide actions to perform based on likely scenarios for emissions costs (or other source attributes) in connection with past and future growth plans for the entity.

In one or more embodiments, the emissions monitoring system 103 utilizes forecasted data generated by the emissions monitoring system 103 to notify an entity of deviations from an emissions plan. For example, in response to detecting a deviation from a forecasted emissions value for one or more physical emissions sources (e.g., based on data from the emissions optimizer system 112 and/or the emissions forecasting system 102), the emissions monitoring system 103 determines whether the deviation meets a threshold value. Based on the deviation meeting the threshold value, the emissions monitoring system 103 generates an alert 1016 including one or more action recommendations to provide to the entity for correcting the deviation with respect to the one or more physical emissions sources. To illustrate, the emissions monitoring system 103 communicates with the emissions optimizer system 112 and/or the emissions forecasting system 102 to generate updated forecasts based on the deviation. Accordingly, even when the entity fails to achieve a particular forecasted emissions value for a future time period, the emissions monitoring system 103 provides real-time monitoring and updated recommendations to adjust emissions usage to still meet the forecasted goals.

Although FIG. 10 illustrates the emissions optimizer system 112, the emissions forecasting system 102, and the emissions monitoring system 103 as being separate, in alternative embodiments, the emissions optimizer system 112, the emissions forecasting system 102, and the emissions monitoring system 103 are part of a single component. For example, the emissions optimizer system 112 may include the emissions forecasting system 102 and/or the emissions monitoring system 103, or the emissions forecasting system 102 may include the emissions optimizer system 112 and the emissions monitoring system 103, etc. Additionally, the emissions optimizer system 112 may include the forecasting machine-learning models 116 and/or the emissions forecasting system 102 may include the modified gradient descent model 1002.

Figure 11A:
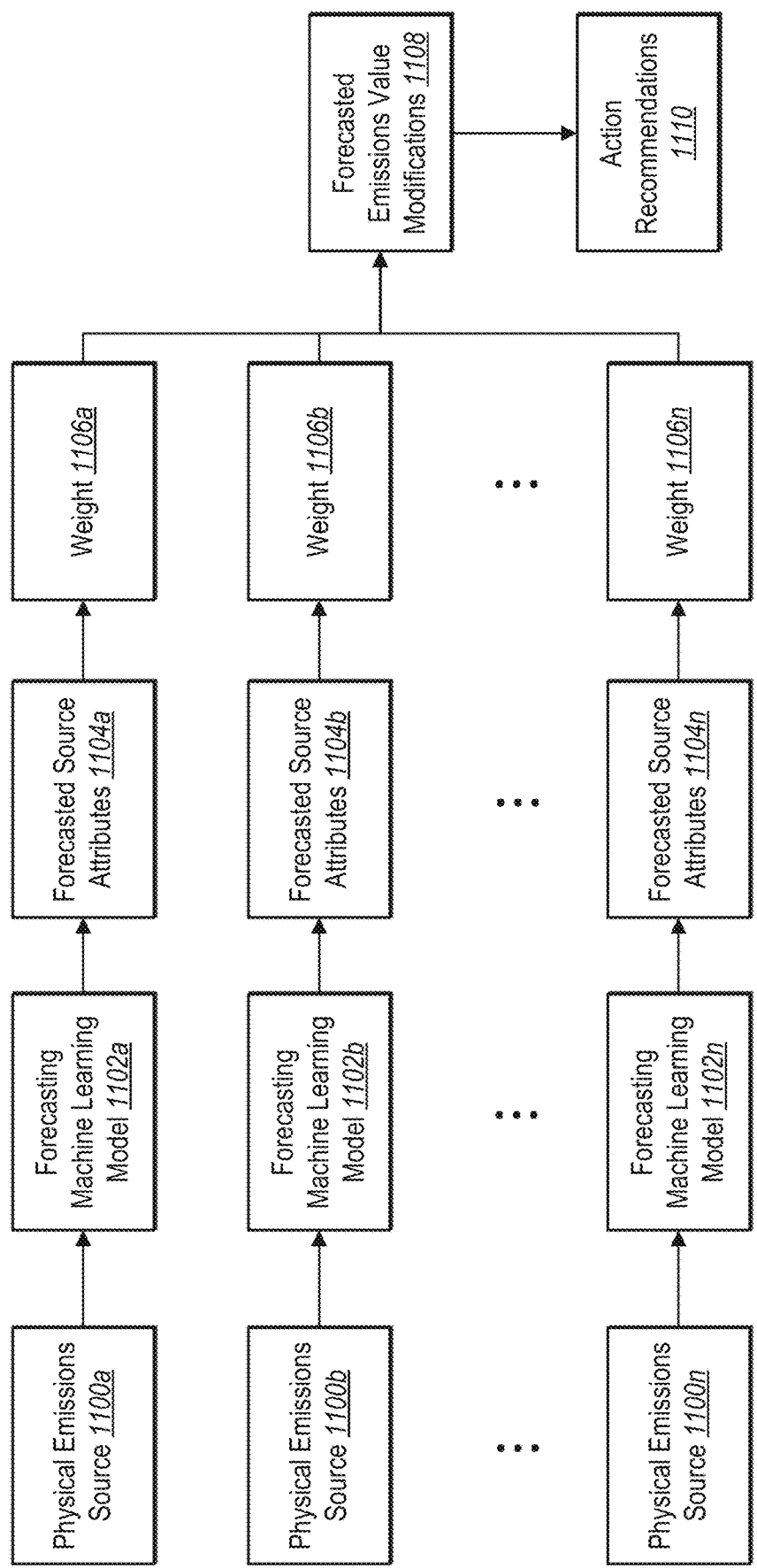
FIGS. 11A-11C illustrate examples of the emissions forecasting system performing operations for generating forecasted emissions value modifications utilizing machine-learning models corresponding to specific physical emissions sources and the emissions modification system performing operations for monitoring emissions by an entity in accordance with one or more implementations.
Figure 11B:
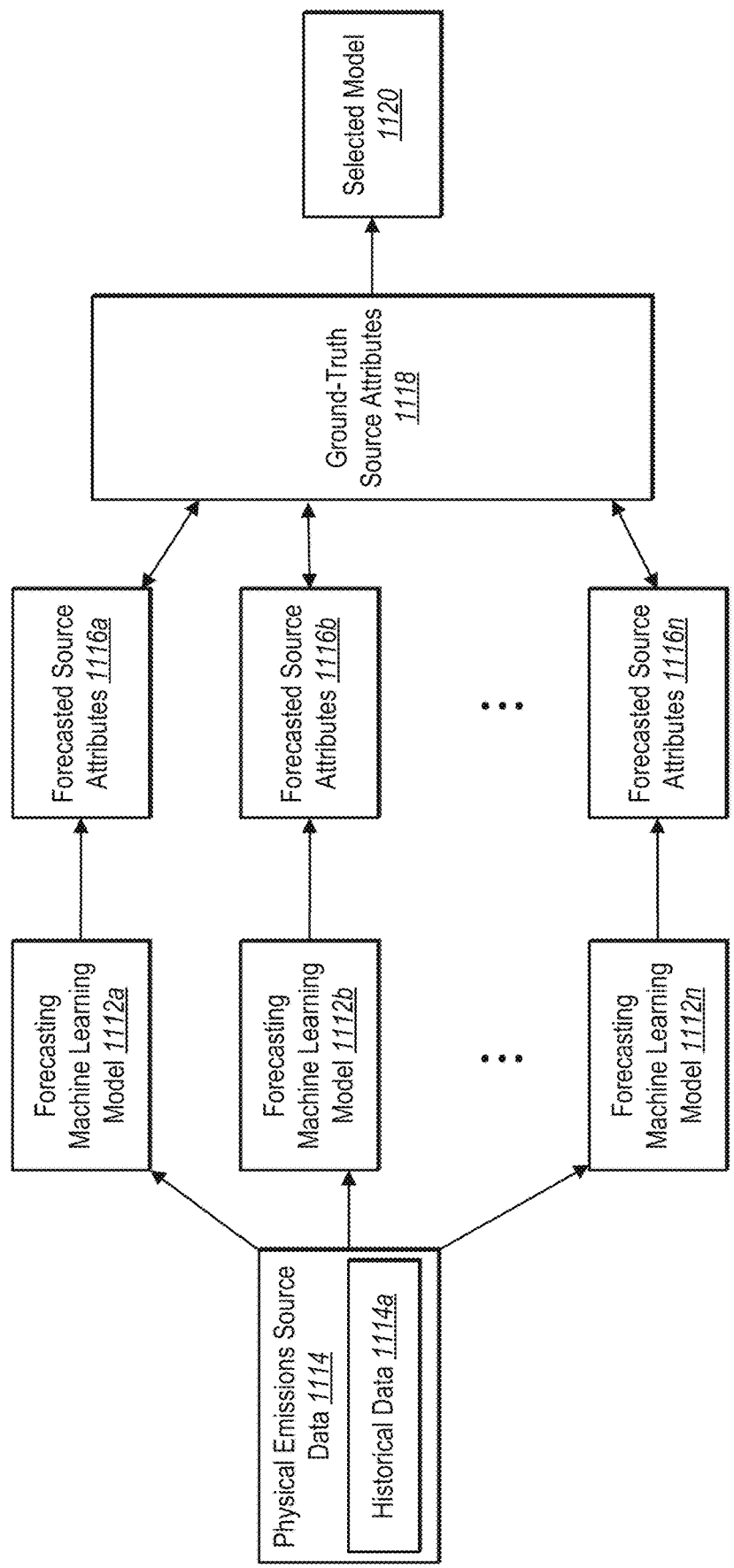
Figure 11C:
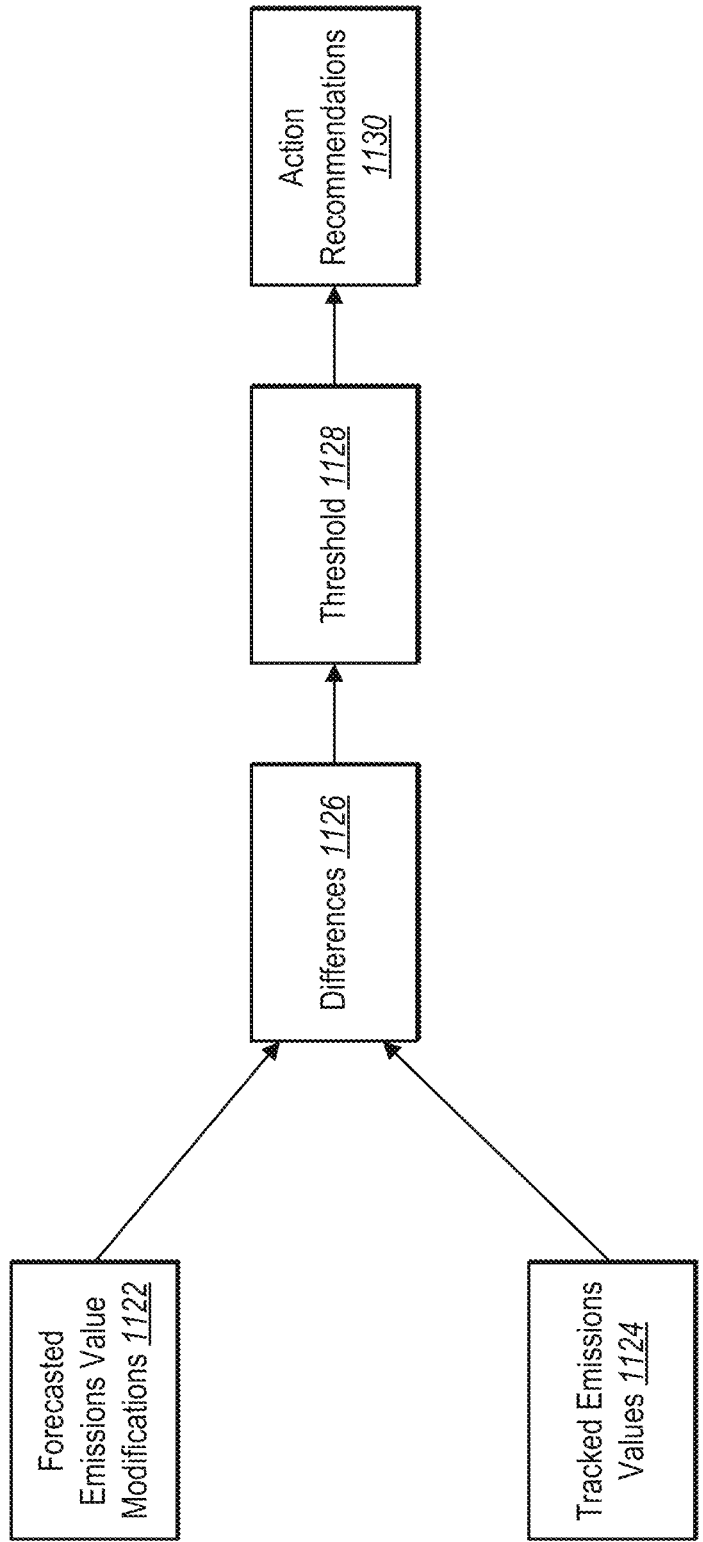

FIGS. 11A-11C illustrate diagrams of the emissions forecasting system 102 generating action recommendations based on forecasted emissions data for physical emissions sources corresponding to an entity. Specifically, as illustrated in FIG. 11A, the emissions forecasting system 102 generates forecasted emissions data for a plurality of physical emissions sources 1100a-1100n. For instance, the emissions forecasting system 102 utilizes a plurality of forecasting machine-learning models 1102-1102n to process data associated with the physical emissions sources 1100a-1100n and generate forecasted source attributes 1104a-1104n for the physical emissions sources 1100a-1100n for a future time period.

As previously mentioned, in one or more embodiments, the physical emissions sources 1100a-1100n are associated with historical data indicating emissions data or other source attributes of the physical emissions sources 1100a-1100n during one or more previous time periods. For example, the emissions forecasting system 102 determines historical data from a most recent time period (e.g., the last year or the last 3-6 months). In another example, the emissions forecasting system 102 determines historical data most representative of a forecasting time period. To illustrate, the emissions forecasting system 102 determines historical data from a time period with similar seasonality attributes (e.g., seasonal demand) to the forecasted time period (e.g., to forecast source attributes for the future time period based on the most relevant historical data).

According to one or more embodiments, the emissions forecasting system 102 determines the forecasting machine-learning models 1102-1102n based on the physical emissions sources 1100a-1100n. In particular, the emissions forecasting system 102 determines a forecasting machine-learning model for a physical emissions source based on one or more attributes of the historical data associated with the physical emissions source. To illustrate, the emissions forecasting system 102 determines a first forecasting machine-learning model 1102a for a first physical emissions source 1100a according to the availability (e.g., amount) of historical data and/or type (e.g., the type(s) of source attributes) of historical data for the first physical emissions source 1100a. Furthermore, the emissions forecasting system 102 determines a second forecasting machine-learning model 1102b for a second physical emissions source 1100b according to the availability and/or type of historical data for the second physical emissions source 1100b. The emissions forecasting system 102 thus determines separate forecasting machine-learning models for the physical emissions sources 1100a-1100n according to the nature of the available data for the physical emissions sources 1100a-1100n. In some embodiments, emissions forecasting system 102 also uses one or more statistical or heuristic models for one or more physical emissions sources according to the available data for the physical emissions sources.

In one or more embodiments, the emissions forecasting system 102 determines one or more attributes of a given dataset (e.g., historical data) associated with a physical emissions source 1100a-1100n. For example, in one or more embodiments, the emissions forecasting system 102 analyses a dataset to determine one or more of the linearity, the stationarity, the volatility, or the size of the dataset. Specifically, in one or more embodiments, the emissions forecasting system 102 performs time series decomposition to determine attributes of a dataset. The emissions forecasting system 102 selects a forecasting machine-learning model based on the one or more determined attributes of the dataset.

More specifically, the emissions forecasting system 102 can determine the linearity of a dataset. For example, the emissions forecasting system 102 determines whether the data of a dataset has a linear or non-linear relationship. For example, the emissions forecasting system 102 generates a data visualization of a time series (e.g., a scatter plot) to determine if point cluster forms a diagonal line.

Additionally, the emissions forecasting system 102 can determine the stationarity of a dataset. For instance, the emissions forecasting system 102 determines whether the dataset is stationary or non-stationary. The emissions forecasting system 102 determines that a dataset is stationary when the time series of the dataset has no trend (e.g., a long-term upward or downward pattern) or seasonality (e.g., a periodic fluctuation). The emissions forecasting system 102 determines that a dataset is non-stationary when the time series of the dataset has a trend or seasonality. In one or more implementations, the emissions forecasting system 102 utilizes a Dickey-Fuller or an Augmented Dickey-Fuller (ADF) test to determine data stationarity.

The emissions forecasting system 102 can determine the volatility of a dataset. For example, the emissions forecasting system 102 determines whether a time series is volatile or non-volatile. The emissions forecasting system 102 determines that a time series is volatile if the time series includes unexpected rises or falls. In one or more implementations, the emissions forecasting system 102 utilizes a Lagrange Multiplier (LM) test to assess the volatility of a dataset. In particular, the emissions forecasting system 102 utilizes the p-values of the ADF and LM tests to indicate if the null hypotheses of the test are accepted to determine the stationarity and volatility of the data. In addition, the emissions forecasting system 102 determines a dataset size based on the number of observations in the dataset.

As mentioned, the emissions forecasting system 102 selects a forecasting machine-learning model based on the one or more determined attributes of the dataset. For example, based on determining that a dataset is linear, stationary, and non-volatile, the emissions forecasting system 102 selects a regression model as a forecasting machine-learning model. In particular, based on determining that a dataset is linear, stationary, and non-volatile, the emissions forecasting system 102 selects an autoregressive integrated moving average model as a forecasting machine-learning model. In one or more further implementations, based on determining that a dataset is non-linear, non-stationary, and non-volatile, the emissions forecasting system 102 selects a support vector machine as a forecasting machine-learning model. In one or more further implementations, based on determining that a dataset is non-linear, non-stationary, and volatile, the emissions forecasting system 102 selects a random forest model as a forecasting machine-learning model.

In one or more embodiments, the emissions forecasting system 102 utilizes the forecasting machine-learning models 1102a-1102n to generate forecasted source attributes 1104a-1104n for the physical emissions sources 1100a-1100n. Specifically, the emissions forecasting system 102 generates forecasted source attributes for a particular physical emissions source to indicate predicted source attributes for a future time period including, but not limited to, a number of units of the physical emissions source and/or per-unit costs for the physical emissions source during the future time period. In particular, the forecasting machine-learning models 1102a-1102n generate the forecasted source attributes based on learned characteristics of historical data associated with the particular physical emissions source.

For instance, the emissions forecasting system 102 utilizes the first forecasting machine-learning model 1102a to generate first forecasted source attributes 1104a indicating a number of units and/or per-unit costs of the first physical emissions source 1100a for the future time period. To illustrate, the emissions forecasting system 102 utilizes the first forecasting machine-learning model 1102a to generate a predicted price-per-gallon of gasoline for a future time period based on historical prices-per-gallon of gasoline. Additionally, the emissions forecasting system 102 utilizes the second forecasting machine-learning model 1102b to generate second forecasted source attributes 1104b indicating a number of units and/or per-unit costs of the second physical emissions source 1100b for the future time period. To illustrate, the emissions forecasting system 102 utilizes the second forecasting machine-learning model 1102b to generate a predicted price-per-unit of electricity based on historical prices-per-unit of electricity.

In some embodiments, the emissions forecasting system 102 generates a plurality of different forecasted source attributes for each physical emissions source for a plurality of different time periods. To illustrate, the emissions forecasting system 102 generates a first set of forecasted source attributes for the plurality of physical emissions sources 1100a-1100n for a first time period. The emissions forecasting system 102 generates a second set of forecasted source attributes for the plurality of physical emissions sources 1100a-1100n for a second time period In one or more embodiments, the emissions forecasting system 102 generates the second set of forecasted source attributes based on the first set of forecasted attributes. In alternative embodiments, the emissions forecasting system 102 generates the forecasted source attributes 1104a-1104n (e.g., a single set of forecasted source attributes) covering a plurality of time periods.

According to one or more embodiments, the emissions forecasting system 102 determines weights 1106a-1106n for the forecasted source attributes 1104a-1104n based on relative importance. In particular, the emissions forecasting system 102 determines contribution proportions of the physical emissions sources 1100a-1100n to various physical emissions source attributes. For example, the emissions forecasting system 102 determines contribution proportions of the physical emissions sources 1100a-1100n to total emissions values and/or total costs for the entity. The emissions forecasting system 102 determines the weights 1106a-1106n based on the contribution proportions. Thus, if the first physical emissions source 1100a has a highest contribution proportion relative to total emissions, the emissions forecasting system 102 determines a first weight 1106a as the highest weight. Additionally, if the second physical emissions source 1100b has a second highest contribution proportion relative to total emissions, the emissions forecasting system 102 determines a second highest weight 1106b as the second highest weight (e.g., proportionally relative to the first weight 1106a).

After determining the weights 1106a-1106n (or otherwise after generating the forecasted source attributes 1104a-1104n), the emissions forecasting system 102 generates forecasted emissions value modifications 1108. Specifically, the emissions forecasting system 102 determines one or more modifications to one or more emissions values of the physical emissions sources 1100a-1100n based on the forecasted source attributes 1104a-1104n (e.g., according to the weights 1106a-1106n). To illustrate, the emissions forecasting system 102 generates the forecasted emissions value modifications 1108 to indicate a change in unit numbers and/or usage of specific physical emissions sources. More specifically, the forecasted emissions value modifications 1108 include changes to one or more physical emissions sources while not changing one or more other physical emissions sources. Additionally, by determining the forecasted emissions value modifications 1108 according to the weights 1106a-1106n, the emissions forecasting system 102 determines changes to the physical emissions sources that are most efficient for reducing emissions, costs, or other source attribute.

According to one or more embodiments, as illustrated in FIG. 11A, the emissions forecasting system 102 generates action recommendations 1110 based on the forecasted emissions value modifications 1108. In particular, the emissions forecasting system 102 determines one or more possible actions that the entity can perform to achieve specific target emissions values based on the forecasted emissions value modifications 1108. To illustrate, the emissions forecasting system 102 converts the forecasted emissions value modifications 1108 into natural language recommendations, as described with respect to FIG. 5. Thus, the emissions forecasting system 102 converts data indicating a forecasted reduction of units/usage of one or more physical emissions sources by a specific amount/percentage into a natural language phrase, sentence, or plurality of sentences. Additionally, as described, the emissions forecasting system 102 further trains the natural language processing engine based on selected natural language recommendations.

As mentioned, in one or more embodiments, the emissions forecasting system 102 selects a plurality of different forecasting machine-learning models for a plurality of physical emissions sources. Thus, in some embodiments, the emissions forecasting system 102 selects a forecasting machine-learning model for a particular physical emissions source from a plurality of available forecasting machine-learning models. To illustrate, the emissions forecasting system 102 selects the forecasting machine-learning model from a plurality of available forecasting machine-learning models based on the accuracy/performance of the forecasting machine-learning models.

According to one or more embodiments, the emissions forecasting system 102 utilizes ensemble forecasting to generate forecasted emissions data for a physical emissions source. FIG. 11B illustrates that the emissions forecasting system 102 selects a particular forecasting machine-learning model from a plurality of forecasting machine-learning models 1112a-1112n for use with a particular physical emissions source. For example, the emissions forecasting system 102 determines the plurality of forecasting machine-learning models 1112a-1112n based on one or more attributes of the physical emissions source. To illustrate, the emissions forecasting system 102 determines one or more forecasting machine-learning models commonly used for specific types of data, amounts of data, or desired output data.

In one or more embodiments, the emissions forecasting system 102 utilizes the plurality of forecasting machine-learning models 1112a-1112n to process training data and/or testing data associated with the physical emissions source. For example, the physical emissions source data 1114 associated with the physical emissions source. More specifically, the emissions forecasting system 102 determines historical data 1114a for one or more past time periods for the physical emissions source. As described previously, historical data for a physical emissions source can include emissions values, costs, or other data associated with the physical emissions source. In additional embodiments, the emissions forecasting system 102 utilizes a plurality of training/testing datasets (e.g., historical data from a plurality of different past time periods and/or including different source attributes) for training/testing the forecasting machine-learning models 1112a-1112n.

According to one or more embodiments, the emissions forecasting system 102 utilizes the forecasting machine-learning models 1112a-1112n to generate forecasted source attributes 1116a-1116n based on the training data. Specifically, the emissions forecasting system 102 utilizes a first forecasting machine-learning model 1112a to generate first forecasted source attributes 1116a from the historical data 1114a. Additionally, the emissions forecasting system 102 utilizes a second forecasting machine-learning model 1112b to generate second forecasted source attributes 1116b from the historical data 1114a. The emissions forecasting system 102 thus utilizes the plurality of forecasting machine-learning models 1112a-1112n to generate different sets of forecasted source attributes according to learned parameters of the forecasting machine-learning models 1112a-1112n based on the training data.

The emissions forecasting system 102 determines the accuracy of the results of the forecasting machine-learning models 1112a-1112n. For instance, as illustrated in FIG. 11B, the emissions forecasting system 102 compares the forecasted source attributes 1116a-1116n to ground-truth source attributes 1118 corresponding to the training dataset. To illustrate, the emissions forecasting system 102 determines the ground-truth source attributes 1118 based on measured source attributes for the physical emissions source. Accordingly, the emissions forecasting system 102 compares the forecasted source attributes 1116a-1116n to the ground-truth source attributes 1118 to determine the accuracy of each forecasting machine-learning model.

After comparing the forecasted source attributes 1116a-1116n to the ground-truth source attributes 1118, the emissions forecasting system 102 determines a selected model 1120. Specifically, the emissions forecasting system 102 selects a forecasting machine-learning model of the plurality of forecasting machine-learning models 1112a-1112n based on the determined accuracies. For example, the emissions forecasting system 102 determines the selected model 1120 as the forecasting machine-learning model with the highest accuracy (e.g., the smallest differences between the corresponding forecasted source attributes and the ground-truth source attributes 1118). To illustrate, if the first forecasting machine-learning model 1112a produces the first forecasted source attributes 1116a closest to the ground-truth source attributes 1118, the emissions forecasting system 102 determines the first forecasting machine-learning model 1112 as the selected model 1120.

In response to determining the selected model 1120, the emissions forecasting system 102 utilizes the selected model 1120 to forecast emissions data for the physical emissions source for a future time period. In some embodiments, the emissions forecasting system 102 utilizes the selected model 1120 with a plurality of additional selected models for a plurality of physical emissions sources to generate forecasted emissions data for the plurality of physical emissions sources. The emissions forecasting system 102 can also determine selected models for one or more additional physical emissions sources without utilizing the process illustrated in FIG. 11B (e.g., by selecting a model based on a mapping of source categories to machine-learning models).

In additional embodiments, the emissions forecasting system 102 determines one or more forecasting machine-learning models for one or more additional physical emissions sources based on the selected model 1120 and the physical emissions source data 1114. To illustrate, the emissions forecasting system 102 determines that the physical emissions source is similar to one or more other physical emissions sources based on attributes of the physical emissions source data 1114. The emissions forecasting system 102 utilizes the selected model 1120 (e.g., a separately trained instance) for an additional physical emissions source to generate forecasted emissions data for the additional physical emissions source.

In one or more embodiments, after determining forecasting machine-learning models to forecast data associated with a plurality of physical emissions sources, the emissions forecasting system 102 monitors progress/performance of an entity in connection with the forecasted data. FIG. 11C illustrates that the emissions monitoring system 103 tracks an entity's performance relative to forecasted data to determine whether to provide additional recommendations to the entity. Specifically, FIG. 11C illustrates that the emissions monitoring system 103 selectively determines whether to provide recommendations to modify physical emissions sources based on detected deviations from the forecasted data.

According to one or more embodiments, the emissions forecasting system 102 generates forecasted emissions value modifications 1122 for a plurality of physical emissions sources utilizing a plurality of forecasting machine-learning models. In particular, the emissions forecasting system 102 generates the forecasted emissions value modifications 1122 for modifying the physical emissions sources during a future time period (e.g., by the end of the future time period). The emissions forecasting system 102 can also provide a plan for modifying the physical emissions sources to achieve the forecasted emissions value modifications 1122 by the indicated time (e.g., by providing a timetable for various modifications).

In connection with the emissions forecasting system 102 providing the forecasted emissions value modifications 1122 to the entity, the emissions monitoring system 103 also tracks the progress of the entity. In one or more embodiments, the emissions monitoring system 103 determines tracked emissions values 1124 including emissions produced by an entity during the future time period corresponding to the forecasted emissions value modifications 1122. In particular, the emissions monitoring system 103 monitors the usage/production of emissions by the entity within a sub-time period of the future time period. To illustrate, the emissions monitoring system 103 monitors the emissions production of the entity (e.g., based on emissions parameters of physical emissions sources corresponding to the entity) during the sub-time period. As an example, the emissions monitoring system 103 obtains electricity, natural gas, gasoline, or other usage of the entity for the sub-time period, such as based on information provided directly by the entity or by a third-party system.

In response to determining the tracked emissions values 1124, the emissions monitoring system 103 detects deviations from an emissions plan generated based on the forecasted emissions value modifications 1122. Specifically, the emissions monitoring system 103 determines differences 1126 between the tracked emissions values 1124 and the forecasted emissions value modifications 1122. The emissions monitoring system 103 can determine the differences 1126 based on total emissions values and/or individual emissions values for the individual physical emissions sources. In one or more embodiments, the emissions monitoring system 103 determines whether the entity is ahead of, on track, or behind a schedule corresponding to the emissions plan for modifying one or more physical emissions sources to reduce emissions. To illustrate, if the entity has an emissions plan to reduce a unit number of a particular physical emissions source by a certain value by the end of the future time period (or by the end of the sub-time period), the emissions monitoring system 103 determines whether the entity is on track to meet the planned unit number.

If the emissions monitoring system 103 determines that there is no deviation from the plan (e.g., the corresponding difference is zero or positive) for a particular physical emissions source or for the combined physical emissions sources, the emissions monitoring system 103 determines that the entity is on track (e.g., ahead of or equal to the planned value). If the emissions monitoring system 103 determines that there is a deviation from the plan (e.g., the corresponding difference is negative), the emissions monitoring system 103 determines whether the difference meets a threshold 1128 (e.g., a threshold emissions difference value). Specifically, the emissions monitoring system 103 determines whether the differences 1126 between the forecasted emissions value modifications 1122 and the tracked emissions values 1124 are significant enough to require adjustment to the plan. In some instances, minor differences may not require adjustment, while greater differences may benefit from adjustment to the plan to meet the forecasted emissions value modifications 1122 by the end of the future time period.

In one or more embodiments, as illustrated in FIG. 11C, upon detecting a deviation of an entity from an emissions plan, the emissions monitoring system 103 generates action recommendations 1130. In particular, in response to determining that the differences 1126 meet the threshold 1128, the emissions monitoring system 103 generates one or more action recommendations (e.g., alerts) to modify one or more physical emissions sources. For example, in response to determining that one or more physical emissions sources caused the tracked emissions values 1124 to deviate from the forecasted emissions value modifications 1122 beyond the bounds of the emissions plan, the emissions monitoring system 103 generates one or more action recommendations with respect to the physical emissions source(s). To illustrate, if the entity failed to reduce a unit number of a physical emissions source by a specific amount by a specific date, the emissions monitoring system 103 generates an action recommendation to correct the deviation. Alternatively, the emissions monitoring system 103 generates an action recommendation to further reduce a different physical emissions source to make up for the deviation in the physical emissions source.

In some embodiments, the emissions monitoring system 103 determines an action to perform by increasing, decreasing, or otherwise modifying one or more values of the emissions plan to more realistically achieve the forecasted emissions value modifications 1122. For instance, if the entity fails to perform certain actions previously recommended by a specific date, the emissions monitoring system 103 modifies one or more time periods in the emissions plan to accommodate the deviation (e.g., rather than recommending correcting the deviation all at once). In some embodiments, the emissions monitoring system 103 also provides one or more action recommendations to modify constraints, target emissions values, or other parameters based on any deviations from the emissions plan. In additional embodiments, the emissions monitoring system 103 also utilizes one or more forecasting machine-learning models to update forecasted data based on the deviations from initial forecasted data.

As previously described, the emissions forecasting system 102 generates forecasted emissions data for physical emissions sources corresponding to an entity for one or more time periods. FIGS. 12A-12C illustrate chart diagrams of the emissions forecasting system 102 processing physical emissions source data for a plurality of physical emissions sources to generate forecasted emissions data. Additionally, FIGS. 12A-12C illustrate that the emissions forecasting system 102 is able to flexibly generate forecasted data for a plurality of individual future time periods or for a combination of time periods.

FIG. 12A illustrates a chart diagram 1200 including a plurality of physical emissions sources corresponding to an entity. In one or more embodiments, as previously noted with respect to FIGS. 8A-8F, physical emissions sources correspond to various source categories based on emissions produced by the physical emissions sources. Additionally, the number and type of physical emissions sources are based on attributes of the entity including, but not limited to, the entity type (e.g., restaurant, manufacturer, delivery service, financial entity), the size of the entity, or other details associated with the entity that affect the emissions production. Furthermore, as illustrated in the chart diagram 1200 includes source attributes such as unit costs, unit sizes, and unit type of each physical emissions source.

In one or more embodiments, the emissions forecasting system 102 utilizes an optimizer system (e.g., the emissions optimizer system 112 of FIG. 1) to generate optimized emissions for the entity. Specifically, FIG. 12B illustrates a chart diagram 1202 including forecasted emissions data for a future time period based on emissions results generated by the emissions optimizer system ("With Optimization"). The emissions forecasting system 102 utilizes the results of the emissions optimizer system (e.g., an optimization of a previous time period) as the baseline for generated forecasted emissions data for the plurality of physical emissions sources (e.g., the forecasted data is based on the optimized data).

Furthermore, in one or more embodiments, the emissions forecasting system 102 generates forecasted emissions data for the future time period without optimization. In particular, as illustrated in the chart diagram 1202 of FIG. 12B, the emissions forecasting system 102 generates forecasted data without the use of an emissions optimizer system. Accordingly, for example, the emissions forecasting system 102 utilizes one or more constraints or goals provided for the entity to generate the forecasted emissions data. As illustrated, the emissions forecasting system 102 thus generates forecasted data that can vary depending on the initial baseline (e.g., with optimized results as a baseline or without optimized results as the baseline). In some embodiments, as illustrated, the emissions forecasting system 102 provides forecasted emissions data for both the optimized and unoptimized cases.

FIG. 12C illustrates a chart diagram 1204 including forecasted emissions data for a plurality of future time periods. Specifically, the emissions forecasting system 102 generates total forecasted emissions data for a plurality of future time periods (e.g., a plurality of years) utilizing forecasting machine-learning models for physical emissions sources of an entity. In one or more embodiments, the emissions forecasting system 102 utilizes the forecasting machine-learning models to generate first forecasted emissions data for a first future time period (e.g., an upcoming year). The emissions forecasting system 102 generates second forecasted emissions data for a subsequent future time period (e.g., the next year) based on the first forecasted emissions data (e.g., an input to the forecasting machine-learning models for the second future time period is based on an output of the first future time period). The emissions forecasting system 102 provides the combined forecasted emissions for the first future time period and the second future time period.

In additional embodiments, the emissions forecasting system 102 provides forecasted emissions data for a plurality of future time periods with details for the individual time periods. Accordingly, rather than (or in addition to) presenting the combined forecasted emissions data for a plurality of future time periods, as in FIG. 12C, the emissions forecasting system 102 provides a breakdown of forecasted emissions data for each of the future time periods. To illustrate, the emissions forecasting system 102 provides forecasted emissions data for a first future time period and forecasted emissions data for a second future time period. In some embodiments, the emissions forecasting system 102 provides the forecasted emissions data for one or more future time periods as part of an emissions plan that includes emissions value modifications based on the forecasted emissions data to allow an entity to view detailed information associated with the forecasted emissions data. Furthermore, the emissions plan can include action recommendations for individual future time periods and/or action recommendations for the combined future time period (e.g., short-term actions and long-term actions).

Figure 13A:
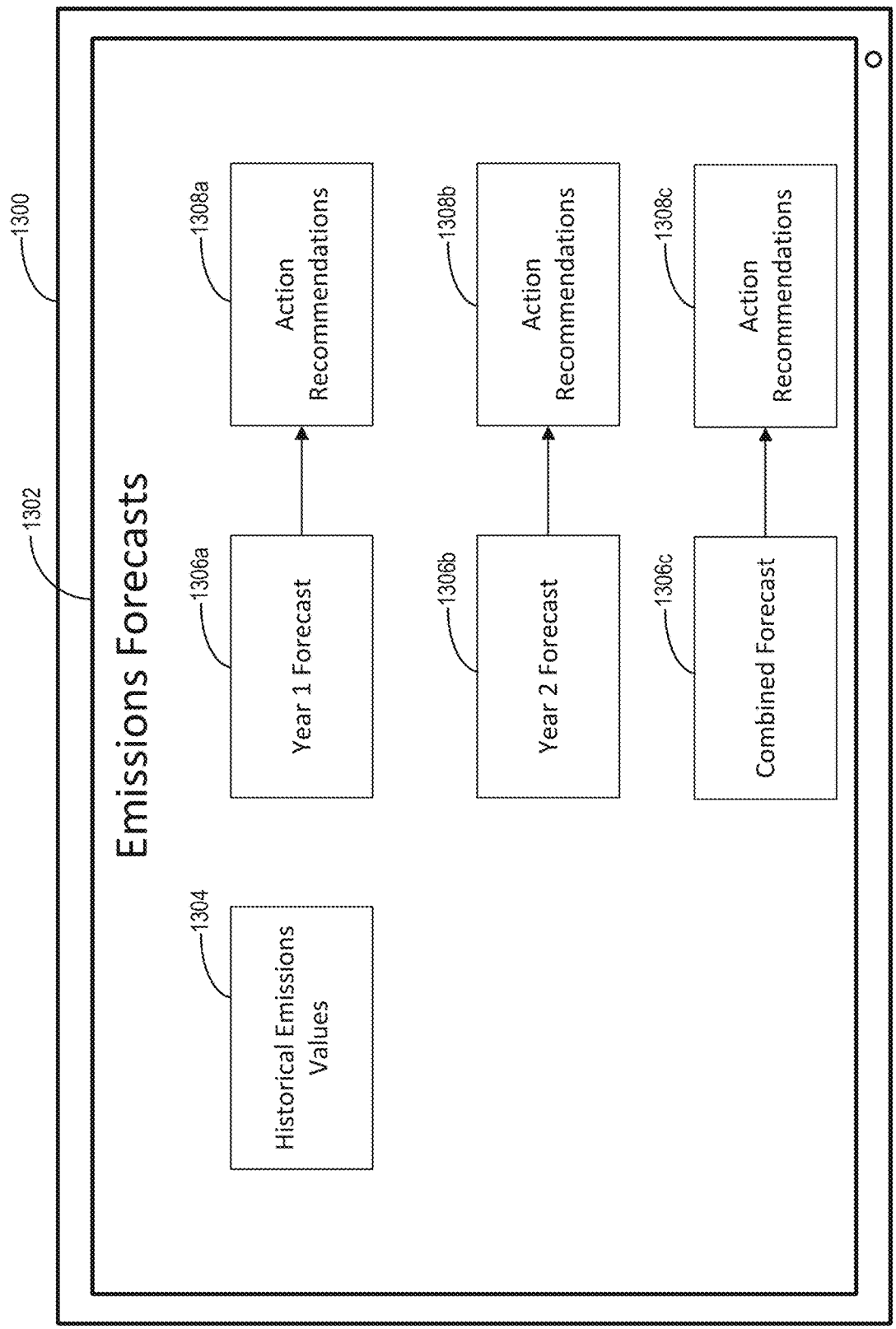
FIGS. 13A-13B illustrate examples of graphical user interfaces including graphical user interface elements for presenting action recommendations utilizing forecasting machine-learning models and monitoring progress of an entity in accordance with one or more implementations.
Figure 13B:
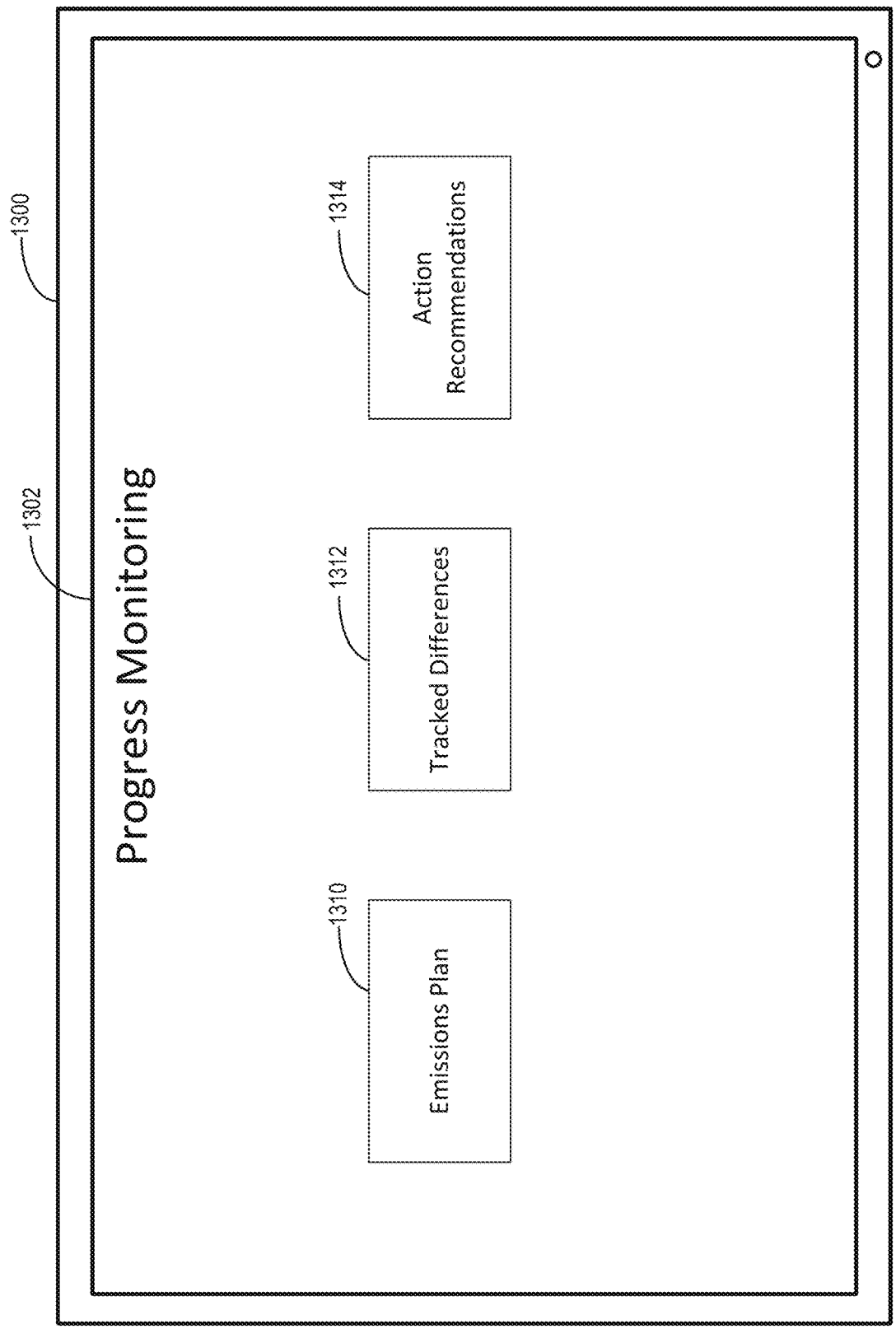

FIGS. 13A-13B illustrate graphical user interfaces for forecasting and monitoring emissions produced by an entity for one or more future time periods. Specifically, FIG. 13A illustrates a client device 1300 presenting a graphical user interface of a client application 1302 for various entity management operations. For instance, the client device 1300 displays a plurality of options for viewing information associated with past and forecasted emissions data. To illustrate, the client device 1300 displays historical emissions values 1304 for a plurality of physical emissions sources corresponding to an entity. The client device 1300 can display, in response to an interaction with a graphical user interface element, the historical emissions values 1304 to allow the entity to view physical emissions source data or other parameters associated with emissions produced by the entity.

Additionally, as illustrated in FIG. 13A, the emissions forecasting system 102 generates forecasted emissions data for a plurality of future time periods. In one or more embodiments, the client device 1300 displays first forecasted emissions data 1306a for a first future time period, second forecasted emissions data 1306b for a second future time period, and combined forecasted emissions data 1306c for a future time period combining the first future time period and the second future time period. In response to interactions with one or more graphical user interface elements, the client device 1300 displays details associated with the forecasted emissions data for the one or more future time periods. Additionally, although FIG. 13A illustrates that the client device 1300 displays forecasted emissions data for a plurality of future time periods, the client device 1300 can display forecasted emissions data for a single future time period at a time.

In one or more embodiments, the emissions forecasting system 102 also provides action recommendations via a client device. For example, as illustrated in FIG. 13A, the client device 1300 displays a plurality of action recommendations 1308a-1308c for each scenario (e.g., each time period or combined time period). To illustrate, the emissions forecasting system 102 generates first action recommendations 1308a for the first future time period, second action recommendations 1308b for the second future time period, and third action recommendations 1308c for the combined future time periods. The client device 1300 displays the action recommendations with the corresponding forecasted emissions data. Furthermore, in response to interactions with one or more graphical user interface elements, the client device 1300 displays additional information associated with the action recommendations, such as timelines, predicted impacts, etc.

In addition to presenting forecasted emissions data and action recommendations based on the forecasted emissions data, the emissions forecasting system 102 also provides data associated with monitoring progress of an entity in connection with an emissions plan. For example, FIG. 13B illustrates that the client device 1300 displays information based on tracked performance of the entity with respect to an emissions plan. To illustrate, the client device 1300 displays an emissions plan 1310 including one or more previously recommended actions, forecasted emissions data, timelines, or other data associated with modifying physical emissions sources of an entity for one or more future time periods (e.g., any information displayed on the client device 1300 in FIG. 13A).

Additionally, the emissions forecasting system 102 tracks emissions data associated with an entity after an entity implements an emissions plan. For example, after an entity has selected an emissions plant (e.g., by selecting a graphical user interface element including an emissions plan with one or more action recommendations for modifying physical emissions sources), the emissions forecasting system 102 tracks the entity's emissions production. To illustrate, the emissions forecasting system 102 tracks physical emissions source data at regular intervals to detect any deviations from the emissions plan. As illustrated in FIG. 13B, the client device 1300 displays tracked differences 1312 including deviations from the emissions plan 1310 based on the tracked emissions data for the entity. This allows the entity to view modifications or actions that the entity has performed or that the entity still needs to perform according to the emissions plan 1310.

In one or more embodiments, the emissions forecasting system 102 also generate action recommendations 1314 (e.g., as a real-time alert) based on the tracked differences 1312. For instance, in response to determining that the tracked differences 1312 meet a threshold (e.g., exceed an emissions difference threshold) for one or more physical emissions sources, the emissions forecasting system 102 generates the action recommendations 1314 to modify (or further modify) one or more physical emissions sources to reduce the differences or correct a deviation. FIG. 13B illustrates that the client device 1300 displays the action recommendations 1314. In some embodiments, the action recommendations 1314 include interactive graphical user interface elements for selecting, implementing, or tracking the action recommendations.

According to one or more embodiments, the emissions forecasting system 102 detects interactions with one or more action recommendations for modifying physical emissions sources according to the tracked differences 1312. For instance, in response to the client device 1300 detecting an interaction with the action recommendations 1314, the emissions forecasting system 102 generates instructions to provide to one or more source modification devices. To illustrate, the emissions forecasting system 102 determines one or more emissions value modifications based on the emissions plan 1310 and the tracked differences 1312. The emissions forecasting system 102 generates instructions to modify one or more physical emissions sources according to the action recommendations 1314 and provides the instructions to the source modification devices to apply one or more changes to the physical emissions sources. Specifically, the emissions forecasting system 102 updates control settings associated with the physical emissions sources to limit usage/time based on a modified source attribute corresponding to the action recommendations 1314.

In additional embodiments, the emissions forecasting system 102 utilizes the tracked differences 1312 to automatically implement modifications to the physical emissions sources. For example, the emissions forecasting system 102 utilizes the tracked differences 1312 to determine deviations from the emissions plan 1310. The emissions forecasting system 102 determines one or more actions to modify the physical emissions sources and reduce the differences during a remaining time period associated with the emissions plan 1310. Additionally, the emissions forecasting system 102 generates instructions for modifying the physical emissions sources based on the determined action(s) and provides the instructions to the source modification device(s) to modify the physical emissions sources. The emissions forecasting system 102 thus automatically implements action recommendations to adjust performance/usage of physical emissions sources based on user selections and/or forecasted/monitored changes in source attributes.

Figure 14:
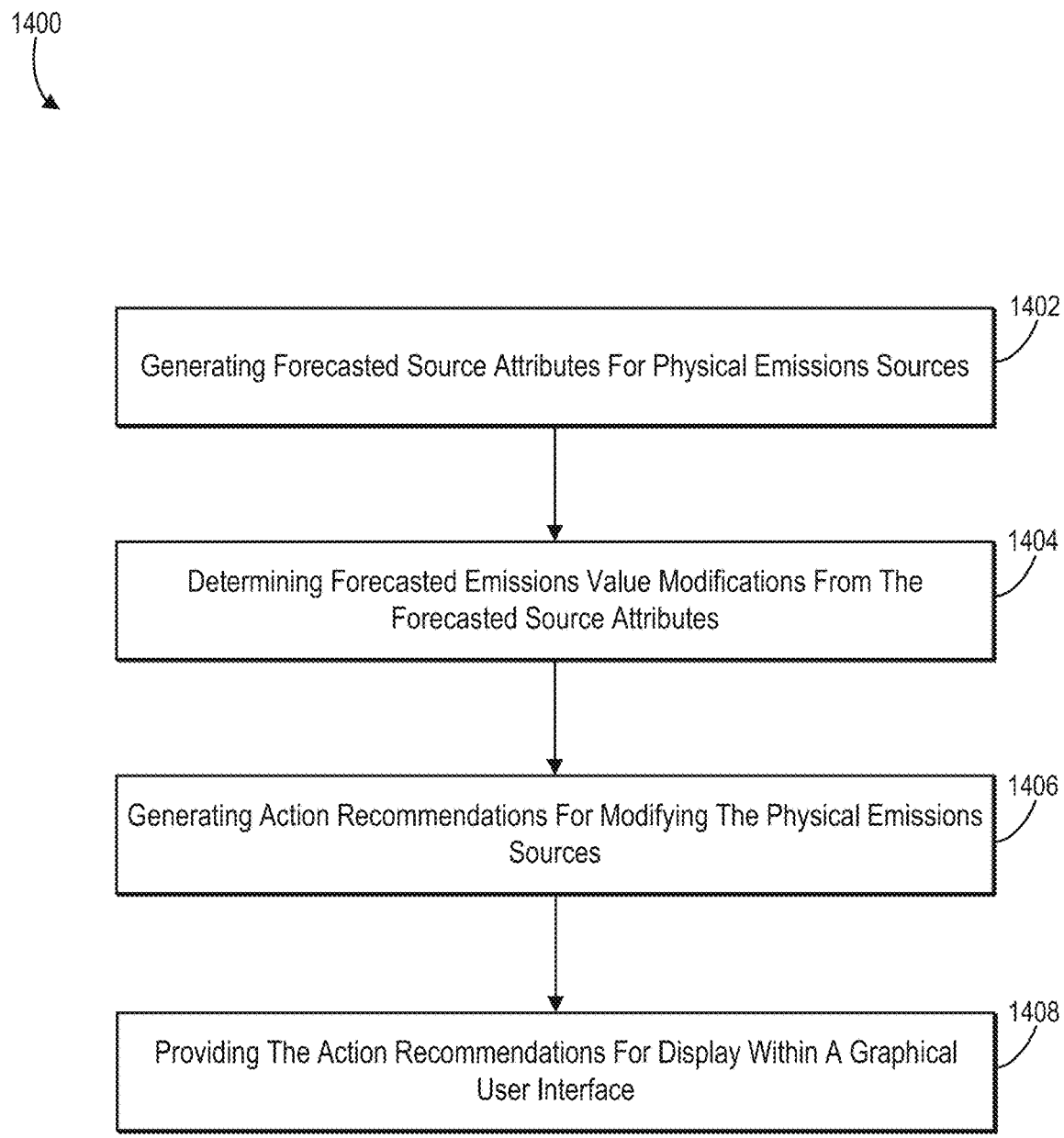
FIG. 14 illustrates a flowchart of a series of acts for generating action recommendations for modifying physical

Turning now to FIG. 14, this figure shows a flowchart of a series of acts 1400 of generating action recommendations for modifying physical emissions sources based on forecasted emissions usage utilizing a plurality of forecasting machine-learning models. While FIG. 14 illustrates acts according to one embodiment, alternative embodiments may omit, add to, reorder, and/or modify any of the acts shown in FIG. 14. The acts of FIG. 14 can be performed as part of a method. Alternatively, a non-transitory computer readable medium can comprise instructions, that when executed by one or more processors, cause a computing device to perform the acts of FIG. 14. In still further embodiments, a system can perform the acts of FIG. 14.

As shown, the series of acts 1400 includes an act 1402 of generating forecasted source attributes for physical emissions sources. For example, act 1402 involves generating, utilizing a plurality of forecasting machine-learning models, a plurality of forecasted source attributes for a plurality of physical emissions sources corresponding to an entity for a future time period according to a plurality of constraints and historical data associated with the entity. In one or more embodiments, the emissions forecasting system 102 utilizes forecasting machine-learning models to perform act 1402, as described above with respect to FIGS. 1, 10, and 11A.

As part of act 1402, or as an additional act, the series of acts 1400 includes determining a plurality of forecasting machine-learning models for a plurality of physical emissions sources based on historical data associated with the plurality of physical emissions sources. For example, the series of acts 1400 includes determining attributes of historical data associated with a physical emissions source of the plurality of physical emissions sources. The series of acts 1400 can further include determining a forecasting machine-learning model for the physical emissions source based on the attributes of the historical data associated with the physical emissions source. The series of acts 1400 can also include determining a second forecasting machine-learning model based on attributes of historical data associated with a second physical emissions source of the plurality of physical emissions sources. The series of acts 1400 can include generating the first set of forecasted source attributes comprising first forecasted source attributes of the first physical emissions source utilizing the first forecasting machine-learning model and second forecasted source attributes of the second physical emissions source utilizing the second forecasting machine-learning model.

The series of acts 1400 can include generating, utilizing a plurality of machine-learning models, a plurality of sets of forecasted source attributes for the physical emissions source for the historical data. The series of acts 1400 can include selecting the forecasting machine-learning model based on the plurality of sets of forecasted source attributes.

Act 1402 can involve generating, utilizing a first forecasting machine-learning model, a first set of forecasted source attributes for a first physical emissions source of the plurality of physical emissions sources. For example, act 1402 can involve determining the first forecasting machine-learning model based on historical data associated with the first physical emissions source. Act 1402 can also involve generating, utilizing a second forecasting machine-learning model, a second set of forecasted source attributes for a second physical emissions source of the plurality of physical emissions sources. Act 1402 can further involve determining the second forecasting machine-learning model based on historical data associated with the second physical emissions source, the second forecasting machine-learning model being different than the first forecasting machine-learning model.

Act 1402 can involve generating, utilizing the plurality of forecasting machine-learning models, a first subset of forecasted source attributes for a first time period. For example, act 1402 can involve generating, utilizing a modified gradient descent model, an initial set of source attributes for the plurality of physical emissions sources according to the plurality of constraints and one or more target emissions values. Act 1402 can involve generating the initial set of source attributes based on historical data for a previous time period. Act 1402 can involve generating the first subset of forecasted source attributes for the first time period based on the initial set of source attributes generated by the modified gradient descent model. Alternatively, act 1402 can involve determining the first subset of forecasted source attributes for the first time period based on the plurality of constraints. Act 1402 can involve generating, utilizing the plurality of forecasting machine-learning models, a first subset of forecasted source attributes comprising per-unit emissions values and per-unit costs of the plurality of physical emissions sources for a first time period.

Act 1402 can also involve generating, utilizing the plurality of forecasting machine-learning models, a second subset of forecasted source attributes for a second time period based on the first subset of forecasted source attributes of the first time period. For example, act 1402 can involve generating, utilizing the plurality of forecasting machine-learning models, a second subset of forecasted source attributes comprising per-unit emissions values and per-unit costs of the plurality of physical emissions sources for a second time period based on the first subset of forecasted source attributes of the first time period.

The series of acts 1400 also includes an act 1404 of determining forecasted emissions value modifications from the forecasted source attributes. For example, act 1404 involves determining a plurality of forecasted emissions value modifications for the plurality of physical emissions sources based on the plurality of forecasted source attributes for the future time period. Act 1404 can also involve determining the plurality of forecasted emissions value modifications based on the plurality of constraints. In one or more embodiments, the emissions forecasting system 102 utilizes forecasting machine-learning models to perform act 1404, as described above with respect to FIGS. 1, 10, and 11A.

Act 1404 can involve determining weights associated with the plurality of physical emissions sources based on contribution proportions of the plurality of physical emissions sources and the plurality of constraints of the entity. Act 1404 can involve determining the plurality of forecasted emissions value modifications based on the weights associated with the plurality of physical emissions sources.

Act 1404 can involve determining a first weight associated with the first set of forecasted source attributes based on the first physical emissions source. Act 1404 can also involve determining a second weight associated with the second set of forecasted source attributes based on the second physical emissions source. Act 1404 can involve determining the plurality of forecasted emissions value modifications based on the first weight associated with the first set of forecasted source attributes and the second weight associated with the second set of forecasted source attributes.

Additionally, the series of acts 1400 includes an act 1406 of generating action recommendations for modifying the physical emissions sources. For example, act 1406 involves generating one or more action recommendations for modifying the plurality of physical emissions sources for the entity based on the plurality of forecasted emissions value modifications for the plurality of physical emissions sources. In one or more embodiments, the emissions forecasting system 102 utilizes forecasting machine-learning models to perform act 1406, as described previously with respect to FIGS. 1, 9, 10, and 11A.

Act 1406 can involve generating, utilizing a natural language processing engine, a natural language action recommendation indicating a modification to one or more emissions values for at least one physical emissions source of the plurality of physical emissions sources. Act 1406 can also involve receiving a selection of the natural language action recommendation from a plurality of natural language recommendations generated utilizing the natural language processing engine. Act 1408 can involve learning parameters of the natural language processing engine based on the selection of the natural language action recommendation.

The series of acts 1400 further includes an act 1408 of providing the action recommendations for display within a graphical user interface. For example, act 1408 involves providing the one or more action recommendations for display via a graphical user interface of a client device of the entity. Act 1408 can involve providing the one or more action recommendations for a plurality of future time periods. Act 1408 can involve providing the one or more action recommendations for a combined future time period corresponding to a plurality of future time periods. Act 1408 can also involve providing the one or more action recommendations for display with historical data associated with the plurality of physical emissions sources and forecasted emissions data for a future time period. In one or more embodiments, the emissions forecasting system 102 or the entity management system 110 performs act 1408, as described above with respect to FIGS. 1, 13A, and 13B.

In one or more embodiments, the series of acts 1400 also includes tracking, during the future time period, emissions values corresponding to the plurality of physical emissions sources of the entity. The series of acts 1400 includes determining differences between the tracked emissions values and the plurality of forecasted emissions value modifications. Additionally, the series of acts 1400 includes generating one or more additional recommendations to modify the plurality of physical emissions sources for the entity based on the differences between the tracked emissions values and the plurality of forecasted emissions value modifications.

The series of acts 1400 can include tracking, for a sub-time period during the first time period, emissions values for the plurality of physical emissions sources corresponding to the entity. The series of acts 1400 can include generating, for the sub-time period, one or more action recommendations to modify the plurality of physical emissions sources in response to determining that differences between the tracked emissions values and the plurality of forecasted emissions value modifications meet a threshold.

In one or more embodiments, the series of acts 1400 includes modifying one or more physical emissions sources modifies, utilizing one or more source modification devices, one or more physical emissions sources of the plurality of physical emissions sources based on an action recommendation of the one or more action recommendations. For example, the series of acts 1400 includes generating instructions for modifying one or more physical emissions sources of the plurality of physical emissions sources based on a selected action recommendation of the one or more action recommendations. The series of acts 1400 also includes modifying, utilizing the one or more service modification devices, one or more control settings associated with the one or more physical emissions sources that limits usage of the one or more physical emissions sources according to the instructions.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 15:
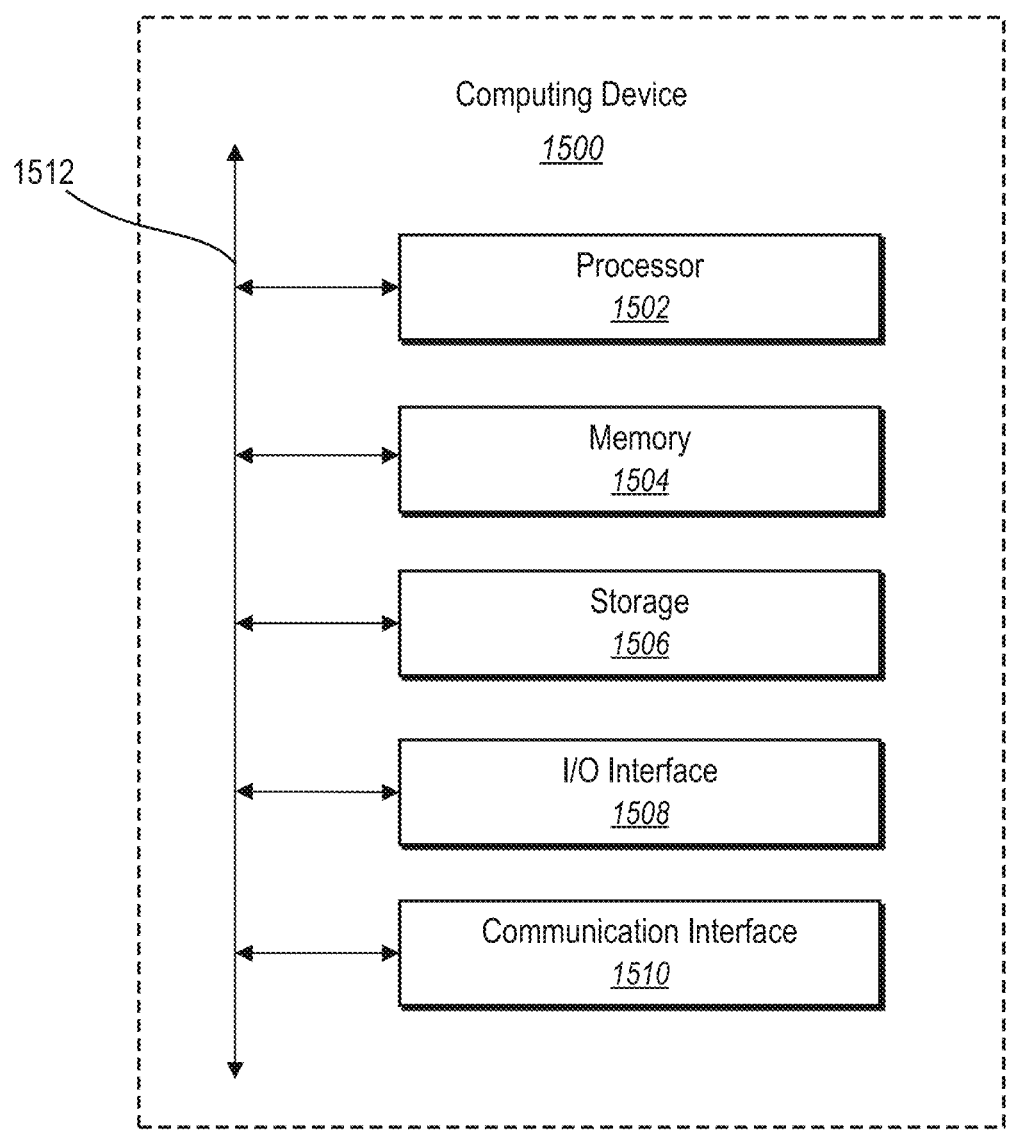
FIG. 15 illustrates a block diagram of an exemplary computing device in accordance with one or more embodiments.

FIG. 15 illustrates a block diagram of exemplary computing device 1500 that may be configured to perform one or more of the processes described above. One will appreciate that one or more computing devices such as the computing device 1500 may implement the system(s) of FIG. 1. As shown by FIG. 15, the computing device 1500 can comprise a processor 1502, a memory 1504, a storage device 1506, an I/O interface 1508, and a communication interface 1510, which may be communicatively coupled by way of a communication infrastructure 1512. In certain embodiments, the computing device 1500 can include fewer or more components than those shown in FIG. 15. Components of the computing device 1500 shown in FIG. 15 will now be described in additional detail.

In one or more embodiments, the processor 1502 includes hardware for executing instructions, such as those making up a computer program. As an example, and not by way of limitation, to execute instructions for dynamically modifying workflows, the processor 1502 may retrieve (or fetch) the instructions from an internal register, an internal cache, the memory 1504, or the storage device 1506 and decode and execute them. The memory 1504 may be a volatile or non-volatile memory used for storing data, metadata, and programs for execution by the processor(s). The storage device 1506 includes storage, such as a hard disk, flash disk drive, or other digital storage device, for storing data or instructions for performing the methods described herein.

The I/O interface 1508 allows a user to provide input to, receive output from, and otherwise transfer data to and receive data from computing device 1500. The I/O interface 1508 may include a mouse, a keypad or a keyboard, a touch screen, a camera, an optical scanner, network interface, modem, other known I/O devices or a combination of such I/O interfaces. The I/O interface 1508 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 1508 is configured to provide graphical data to a display for presentation to a user. The graphical data may be representative of one or more graphical user interfaces and/or any other graphical content as may serve a particular implementation.

The communication interface 1510 can include hardware, software, or both. In any event, the communication interface 1510 can provide one or more interfaces for communication (such as, for example, packet-based communication) between the computing device 1500 and one or more other computing devices or networks. As an example, and not by way of limitation, the communication interface 1510 may include a network interface controller (NIC) or network adapter for communicating with an Ethernet or other wire-based network or a wireless NIC (WNIC) or wireless adapter for communicating with a wireless network, such as a WI-FI.

Additionally, the communication interface 1510 may facilitate communications with various types of wired or wireless networks. The communication interface 1510 may also facilitate communications using various communication protocols. The communication infrastructure 1512 may also include hardware, software, or both that couples components of the computing device 1500 to each other. For example, the communication interface 1510 may use one or more networks and/or protocols to enable a plurality of computing devices connected by a particular infrastructure to communicate with each other to perform one or more aspects of the processes described herein. To illustrate, the digital content campaign management process can allow a plurality of devices (e.g., a client device and server devices) to exchange information using various communication networks and protocols for sharing information such as electronic messages, user interaction information, engagement metrics, or campaign management resources.

In the foregoing specification, the present disclosure has been described with reference to specific exemplary embodiments thereof. Various embodiments and aspects of the present disclosure(s) are described with reference to details discussed herein, and the accompanying drawings illustrate the various embodiments. The description above and drawings are illustrative of the disclosure and are not to be construed as limiting the disclosure. Numerous specific details are described to provide a thorough understanding of various embodiments of the present disclosure.

The present disclosure may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

What is claimed is:

1. A computer-implemented method comprising:
    generating, by at least one processor utilizing a plurality of forecasting machine-learning models, a plurality of forecasted source attributes for a plurality of physical emissions sources corresponding to an entity for a future time period according to a plurality of constraints and historical data associated with the entity, the plurality of constraints comprising a minimum constraint indicating a minimum number of physical objects corresponding to a particular physical emissions source of the plurality of physical emissions sources or a maximum constraint indicating a maximum number of physical objects corresponding to the particular physical emissions source;
    determining, by the at least one processor, a plurality of forecasted emissions value modifications for the plurality of physical emissions sources based on the plurality of forecasted source attributes and the plurality of constraints comprising the minimum number of physical objects or the maximum number of physical objects for the future time period;
    generating, by the at least one processor, one or more action recommendations for modifying the plurality of physical emissions sources for the entity based on the plurality of forecasted emissions value modifications for the plurality of physical emissions sources;
    providing the one or more action recommendations for display via a graphical user interface of a client device of the entity; and
    modifying, utilizing one or more source modification devices, one or more control settings associated with a physical emissions source of the plurality of physical emissions sources that limit usage of the physical emissions source based on a selected action recommendation of the one or more action recommendations.

2. The computer-implemented method as recited in claim 1, wherein generating the plurality of forecasted source attributes comprises:
    generating, utilizing a first forecasting machine-learning model, a first set of forecasted source attributes for a first physical emissions source of the plurality of physical emissions sources; and
    generating, utilizing a second forecasting machine-learning model, a second set of forecasted source attributes for a second physical emissions source of the plurality of physical emissions sources.

3. The computer-implemented method as recited in claim 2, wherein generating the plurality of forecasted source attributes comprises:
    determining the first forecasting machine-learning model based on historical data associated with the first physical emissions source; and
    determining the second forecasting machine-learning model based on historical data associated with the second physical emissions source, the second forecasting machine-learning model being different than the first forecasting machine-learning model.

4. The computer-implemented method as recited in claim 2, wherein determining the plurality of forecasted emissions value modifications for the plurality of physical emissions sources comprises:
  determining a first weight associated with the first set of forecasted source attributes based on the first physical emissions source;
  determining a second weight associated with the second set of forecasted source attributes based on the second physical emissions source; and
  determining the plurality of forecasted emissions value modifications based on the first weight associated with the first set of forecasted source attributes and the second weight associated with the second set of forecasted source attributes.

5. The computer-implemented method as recited in claim 1, wherein generating the plurality of forecasted source attributes comprises:
  generating, utilizing the plurality of forecasting machine-learning models, a first subset of forecasted source attributes for a first time period; and
  generating, utilizing the plurality of forecasting machine-learning models, a second subset of forecasted source attributes for a second time period based on the first subset of forecasted source attributes of the first time period.

6. The computer-implemented method as recited in claim 5, wherein generating the first subset of forecasted source attributes for the first time period comprises:
  generating, utilizing a modified gradient descent model, an initial set of source attributes for the plurality of physical emissions sources according to the plurality of constraints and one or more target emissions values; and
  generating the first subset of forecasted source attributes for the first time period based on the initial set of source attributes generated by the modified gradient descent model.

7. The computer-implemented method as recited in claim 1, wherein modifying the one or more control settings associated with the physical emissions source of the plurality of physical emissions sources comprises:
  generating computer-executable instructions to limit the usage of the physical emissions source of the plurality of physical emissions sources based on the selected action recommendation of the one or more action recommendations; and
  modifying the one or more control settings associated with the physical emissions source of the plurality of physical emissions sources by causing the one or more source modification devices to execute the computer-executable instructions.

8. The computer-implemented method as recited in claim 1, wherein generating the one or more action recommendations for modifying the plurality of physical emissions sources comprises generating, utilizing a natural language processing engine, a natural language action recommendation indicating a modification to one or more emissions values for at least one physical emissions source of the plurality of physical emissions sources.

9. The computer-implemented method as recited in claim 8, wherein generating the one or more action recommendations for modifying the plurality of physical emissions sources comprises:
  receiving a selection of the natural language action recommendation from a plurality of natural language recommendations generated utilizing the natural language processing engine; and
  learning parameters of the natural language processing engine based on the selection of the natural language action recommendation.

10. The computer-implemented method as recited in claim 1, further comprising:
  tracking, during the future time period, emissions values corresponding to the plurality of physical emissions sources of the entity;
  determining differences between the tracked emissions values and the plurality of forecasted emissions value modifications; and
  generating one or more additional recommendations to modify the plurality of physical emissions sources for the entity based on the differences between the tracked emissions values and the plurality of forecasted emissions value modifications.

11. A system comprising:
  one or more source modification devices configured to control operations of a plurality of physical emissions sources corresponding to an entity; and
  one or more processors configured to cause the system to:
  determine a plurality of forecasting machine-learning models for the plurality of physical emissions sources based on historical data associated with the plurality of physical emissions sources;
  generate, utilizing the plurality of forecasting machine-learning models, a plurality of forecasted source attributes for the plurality of physical emissions sources corresponding to the entity for a future time period according to a plurality of constraints associated with the entity, the plurality of constraints comprising a minimum number of physical objects corresponding to a particular physical emissions source of the plurality of physical emissions sources or a maximum number of physical objects corresponding to the particular physical emissions source;
  determine a plurality of forecasted emissions value modifications for the plurality of physical emissions sources based on the plurality of forecasted source attributes for the future time period and the plurality of constraints comprising the minimum number of physical objects or the maximum number of physical objects for the future time period;
  generate one or more action recommendations for modifying the plurality of physical emissions sources for the entity based on the plurality of forecasted emissions value modifications for the plurality of physical emissions sources; and
  modify, utilizing the one or more source modification devices, one or more control settings associated with a physical emissions source of the plurality of physical emissions sources that limit usage of the physical emissions source based on a selected action recommendation of the one or more action recommendations.

12. The system as recited in claim 11, wherein the one or more processors are configured to cause the system to determine the plurality of forecasting machine-learning models for the plurality of physical emissions sources by:
  determining attributes of historical data associated with the particular physical emissions source of the plurality of physical emissions sources; and
  determining a forecasting machine-learning model for the particular physical emissions source based on the attributes of the historical data associated with the physical emissions source.

13. The system as recited in claim 12, wherein the one or more processors are configured to cause the system to determine the forecasting machine-learning model for the particular physical emissions source by:
  generating, utilizing a plurality of machine-learning models, a plurality of sets of forecasted source attributes for the particular physical emissions source for the historical data; and
  selecting the forecasting machine-learning model based on the plurality of sets of forecasted source attributes.

14. The system as recited in claim 11, wherein the one or more processors are configured to cause the system to generate the plurality of forecasted source attributes by:
  generating, utilizing the plurality of forecasting machine-learning models, a first subset of forecasted source attributes comprising per-unit emissions values and per-unit costs of the plurality of physical emissions sources for a first time period; and
  generating, utilizing the plurality of forecasting machine-learning models, a second subset of forecasted source attributes comprising per-unit emissions values and per-unit costs of the plurality of physical emissions sources for a second time period based on the first subset of forecasted source attributes of the first time period.

15. The system as recited in claim 11, wherein the one or more processors are configured to cause the system to determine the plurality of forecasted emissions value modifications for the plurality of physical emissions sources by:
  determining weights associated with the plurality of physical emissions sources based on contribution proportions of the plurality of physical emissions sources and the plurality of constraints; and
  determining the plurality of forecasted emissions value modifications based on the weights associated with the plurality of physical emissions sources.

16. The system as recited in claim 11, wherein the one or more processors are configured to cause the system to:
  track emissions values corresponding to the plurality of physical emissions sources during the future time period; and
  generate one or more additional action recommendations to modify the plurality of physical emissions sources based on the tracked emissions values relative to the plurality of forecasted emissions value modifications.

17. A non-transitory computer readable medium storing instructions thereon that, when executed by at least one processor, cause a computing device to perform operations comprising:
  generating, utilizing a plurality of forecasting machine-learning models, a first set of forecasted source attributes for a plurality of physical emissions sources corresponding to an entity for a first time period according to a plurality of constraints comprising a first minimum number of physical objects corresponding to a particular physical emissions source of the plurality of physical emissions sources or a first maximum number of physical objects corresponding to the particular physical emissions source;
  generating, utilizing the plurality of forecasting machine-learning models, a second set of forecasted source attributes for the plurality of physical emissions sources corresponding to the entity for a second time period according to the plurality of constraints comprising a second minimum number of physical objects corresponding to the particular physical emissions source or a second maximum number of physical objects corresponding to the particular physical emissions source;
  determining, for the first time period and the second time period, a plurality of forecasted emissions value modifications for the plurality of physical emissions sources based on the first set of forecasted source attributes and the second set of forecasted source attributes;
  generating one or more action recommendations for modifying the plurality of physical emissions sources for the entity based on the plurality of forecasted emissions value modifications for the plurality of physical emissions sources;
  providing the one or more action recommendations for display via a graphical user interface of a client device of the entity; and
  modify, utilizing one or more source modification devices, one or more control settings associated with a physical emissions source of the plurality of physical emissions sources that limit usage of the physical emissions source based on a selected action recommendation of the one or more action recommendations.

18. The non-transitory computer readable medium as recited in claim 17, wherein generating the first set of forecasted source attributes for the plurality of physical emissions sources comprises:
  generating, utilizing a modified gradient descent model, an initial set of source attributes for the plurality of physical emissions sources according to the plurality of constraints and one or more target emissions values based on historical data for a previous time period;
  generating, utilizing the plurality of forecasting machine-learning models, the first set of forecasted source attributes for the plurality of physical emissions sources based on the initial set of source attributes; and
  generating, utilizing the plurality of forecasting machine-learning models, the second set of forecasted source attributes for the plurality of physical emissions sources based on the first set of forecasted source attributes.

19. The non-transitory computer readable medium as recited in claim 17, wherein generating the first set of forecasted source attributes for the plurality of physical emissions sources comprises:
  determining a first forecasting machine-learning model based on attributes of historical data associated with a first physical emissions source of the plurality of physical emissions sources;
  determining a second forecasting machine-learning model based on attributes of historical data associated with a second physical emissions source of the plurality of physical emissions sources; and
  generating the first set of forecasted source attributes comprising first forecasted source attributes of the first physical emissions source utilizing the first forecasting machine-learning model and second forecasted source attributes of the second physical emissions source utilizing the second forecasting machine-learning model.

20. The non-transitory computer readable medium as recited in claim 17, further comprising instructions that, when executed by the at least one processor, cause the computing device to perform operations comprising:
  tracking, for a sub-time period during the first time period, emissions values for the plurality of physical emissions sources corresponding to the entity; and
  generating, for the sub-time period, one or more action recommendations to modify the plurality of physical emissions sources in response to determining that differences between the tracked emissions values and the plurality of forecasted emissions value modifications meet a threshold.

\* \* \* \* \*